United States Patent
Haynes

(10) Patent No.: US 9,677,908 B2
(45) Date of Patent: Jun. 13, 2017

(54) METROLOGY TIMEKEEPING SYSTEMS AND METHODS

(71) Applicant: Aclara Technologies LLC, Hazelwood, MO (US)

(72) Inventor: David Haynes, St. Peters, MO (US)

(73) Assignee: Aclara Technologies LLC, Hazelwood, MO (US)

( * ) Notice: Subject to any disclaimer, the term of this patent is extended or adjusted under 35 U.S.C. 154(b) by 446 days.

(21) Appl. No.: 14/359,180

(22) PCT Filed: Nov. 19, 2012

(86) PCT No.: PCT/US2012/065764
§ 371 (c)(1),
(2) Date: May 19, 2014

(87) PCT Pub. No.: WO2013/078105
PCT Pub. Date: May 30, 2013

(65) Prior Publication Data
US 2014/0320305 A1   Oct. 30, 2014

Related U.S. Application Data

(60) Provisional application No. 61/562,787, filed on Nov. 22, 2011.

(51) Int. Cl.
*G08B 23/00* (2006.01)
*G08C 15/06* (2006.01)
(Continued)

(52) U.S. Cl.
CPC .............. *G01D 4/002* (2013.01); *H04Q 9/00* (2013.01); *H04Q 2209/20* (2013.01); *H04Q 2209/826* (2013.01)

(58) Field of Classification Search
CPC .... G01D 4/002; H04Q 2209/826; H04Q 9/00; H04Q 2209/20
(Continued)

(56) References Cited

U.S. PATENT DOCUMENTS 6,661,810 B1   12/2003   Skelly et al.
7,085,268 B2   8/2006    Fukuda et al.
(Continued)

FOREIGN PATENT DOCUMENTS

WO   2013078105 A1   5/2013

OTHER PUBLICATIONS

Koster et al., "4 Clock Synchronization", University of Kaiserslautern, Sep. 22, 2014, accessed at http://web.archive.org/web/20131113132107/http://wwwagss.informatik.uni-kl.de/Projekte/Squirrel/da/node6.html on Jan. 18, 2011, 10 pages.
(Continued)

*Primary Examiner* — Firmin Backer
*Assistant Examiner* — Jerold Murphy
(74) *Attorney, Agent, or Firm* — Senniger Powers LLP

(57) ABSTRACT

An advanced metering infrastructure (AMI) system includes a meter data management system, an AMI network, a network communication module and metering devices. The AMI network connects to a reference time clock and the meter data management system. The network communication module connects to the AMI network and is in communication with the reference time clock via the AMI network. Each metering device is connected to the network communication module and has a metrology device and a communication module device. The communication module device provides clock adjustments to the metrology clock and/or its own clock. The metrology device provides clock adjustments to the communications module clock and/or its own clock. Methods for use in an advanced metering infrastructure (AMI) system provide clock adjustments.

21 Claims, 16 Drawing Sheets

(51) Int. Cl.
  *G08C 19/20* (2006.01)
  *G05D 3/12* (2006.01)
  *G01R 15/00* (2006.01)
  *G01D 4/00* (2006.01)
  *H04Q 9/00* (2006.01)

(58) Field of Classification Search
  USPC .................................. 340/870.02, 3.2, 4.2
  See application file for complete search history.

(56) References Cited

U.S. PATENT DOCUMENTS

| | | |
|---|---|---|
| 7,180,517 B2 | 2/2007 | Haynes |
| 7,397,877 B2* | 7/2008 | Miao .................... H04J 3/0632 375/356 |
| 7,733,245 B2 | 6/2010 | Spencer |
| 7,831,884 B2 | 11/2010 | Spencer |
| 8,843,241 B2* | 9/2014 | Saberi ................ F16K 37/0091 251/129.04 |
| 2008/0084833 A1 | 4/2008 | Picard |
| 2008/0279321 A1* | 11/2008 | Bickel ................... G01D 4/002 375/356 |

OTHER PUBLICATIONS

Ryu et al., "Timing Constraint Remapping to Achieve Time Equi-continuity in Distributed Real-Time Systems", IEEE Transactions on Computers, vol. 50, No. 12, Dec. 2001, pp. 1310-1320.

* cited by examiner

United States Patent US 9,677,908 B2

METROLOGY TIMEKEEPING SYSTEMS AND METHODS

BACKGROUND

When a clock is used to perform a continuous monitoring process such as metering, changes to the clock must be performed very carefully. The challenge is to quantify the limits by which time can be changed without having an adverse effect on the metering data.

Electric utilities are currently transitioning away from electromechanical meters (typically 2% accuracy class) to solid-state meters (often 0.2% accuracy class). This transition has "raised the bar" to improve the quality of the data delivered by the meter reading system. Furthermore, the transition of the industry from one-way AMR (Advanced Meter Reading) systems to two-way AMI (Advanced Metering Infrastructure) systems has introduced new features such as hourly interval data and meter clock maintenance which "raise the bar" for the need of accurate timekeeping.

The American National Standards Institute (ANSI) "Code for Electricity Metering," No. C12.1, specifies that meters must have a clock that maintains time with an error no greater than two (2) minutes per week. This corresponds to a maximum allowable slew error rate of 198 $\mu$S/S. This however is not the only criteria that must be met. Meters are built to guarantee a certain level of performance in terms of accuracy. In order to maintain such accuracy, meter manufacturers must control a number of unrelated processes inside and outside of the meter.

Meter clocks must be maintained within a prescribed tolerance or the meter function is compromised. The "accuracy class" of many solid state revenue meters today is 0.2%, and the need for 0.1% tolerance has been identified. This presents a challenge for the time synchronization function. Most measurements in the meter are time based. For example, the measurement of energy over a "demand interval" is the observation of usage over a specific period of time. If we assume a continuous, steady flow of energy near the maximum amount allowed by the meter, even "small" changes to time can affect data in a corresponding manner and cause the meter to fail to measure data accurately.

Demand is commonly measured over a 15 minute interval. Likewise, a common practice has been to broadcast a time synchronization message (i.e., a time sync) every 15 minutes to the communication modules. This conceivably causes every demand interval calculated to be affected by the phenomenon. With a system running one (1) minute interval analysis on a 0.1% metrology system, this implies that a change of merely 60 mS could disrupt the quality of the data.

SUMMARY

In one form, an advanced metering infrastructure (AMI) system includes a meter data management system, an AMI network, a network communication module and metering devices. The AMI network connects to a reference time clock and the meter data management system. The network communication module connects to the AMI network and is in communication with the reference time clock via the AMI network. Each metering device is connected to the network communication module and has a metrology device having a metrology clock and providing metering information based on its metrology clock. Each metering device also has a communication module device having a clock and is connected between the metrology device and network communication module for communicating the metering information of the metrology device to the meter data management system via the network communication module and via the AMI network. The communication module device provides clock adjustments to the metrology clock and/or its own clock. The metrology device provides clock adjustments to the communications module clock and/or to its own clock.

In other forms, methods of correcting are provided.

In other forms, communications modules for correcting time are provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The invention assumes that all processes within and without a meter are maintained so that the entire error budget is available to clock error. On this basis, the maximum allowable clock error is identified. According to the invention, time syncs are provided with enough resolution so that time is more accurately specified than the threshold of the most sensitive application.

Figure 1:
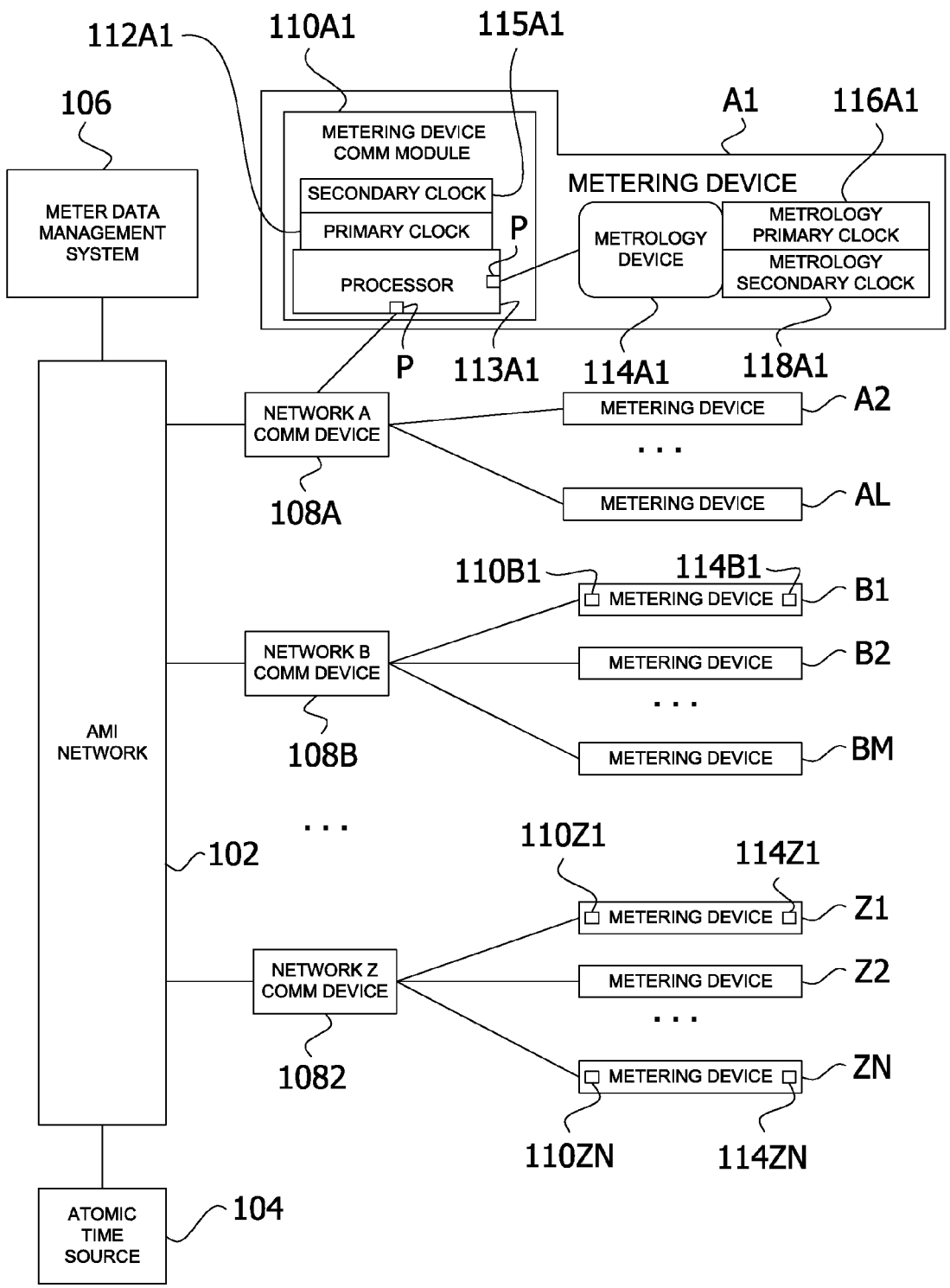
FIG. 1 is a block diagram illustrating an architecture deployment according to one embodiment.

FIG. 1 is a block diagram illustrating an architecture deployment according to one embodiment. An Advanced Metering Infrastructure (AMI) network 102 connects to a time source (i.e., a reference time clock or an authoritative source for time), such as an atomic clock 104, which provides an accurate, common time reference for use by all components connected to the AMI network 102. This common time reference allows the various components to provide metering information to a meter data management system 106 in which the data the various components is time-stamped according to the common time reference provided by source 104. Components connected to the AMI network 102 include a plurality of Z network communication devices 108A to 108Z which provide a communication link between the AMI network 102 and metering devices so that each network communication device 108 is connected to a plurality of metering devices. In particular, device 108A connects to L metering devices A1-AL to provide a communication link between the metering devices A and the AMI network 102. Similarly, device 108B connects to M metering devices B1-BM to provide a communication link between the metering devices B and the AMI network 102. Similarly, device 108Z connects to N metering devices Z1-ZN to provide a communication link between the metering devices Z and the AMI network 102.

As used herein, L, M, N and Z are intended to represent an integer number greater than one, depending on the configuration of the AMI network 102, depending on its network communication devices 108 and depending on its metering devices A, B, Z. For example, in one embodiment, an AMI network 102 may be connected to 10 or more network communication devices 108, which each device 108 connected to 100 to 1000 metering devices A, B, Z. As used herein, "connect" and "connection" mean either a wired and/or wireless connection between two or more components, either directly or indirectly through other components.

Each metering device A, B, Z includes a metering device communication module 110 and a metrology device 114 which monitors usage. The metering device communication module 110 provides a communication link between the metrology device 114 and its connected network communication device 108. For examples and discussions relating to communication modules and metrology devices, see the following U.S. Patent, each of which is incorporated herein by reference in its entirety: U.S. Pat. No. 7,227,462 relates to a fast polling method to detect the presence of numerous communication modules quickly using a TWACS AMI network; U.S. Pat. No. 5,933,072 describes a method for automatically setting the signal strength for communicating TWACS inbound messages (flowing from the communication module, out of the metrology device, and toward a central office of a meter data management system; U.S. Pat. No. 7,831,884 relates to a technique for creating Cyclic Redundancy Codes to protect messages flowing inward from the communication module to the central office; and U.S. Pat. No. 7,312,693 describes a method to improve the burst message capacity from a TWACS communication module.

Each metering device communication module 110A1, 110B1, . . . , 110Z1, 110ZN includes a communication module primary clock 112 (and optionally, a secondary clock 115) which provides a time reference for its metering device communication module 110 and a processor 113A1. Each processor 113 has input/output ports (I/O) P which connect to and interface with the network communication device 108 and its metrology device 114. Each metering device A, B, Z also includes a metrology device 114A1, 114B1, . . . , 114Z1, 114ZN for monitoring usage and/or gathering time-stamped metering data which will be provided to the meter data management system 106 via the metering device communication module 110, the network communication device 108 and the AMI network 102. The metrology device 114 includes at least a primary metrology clock 116 and optionally to a secondary metrology clock 118 which provide time information for the metering data. The optional secondary clock is used when the primary clock is otherwise not available. The clocks 112, 116, 118 are synchronized to the atomic time source 104.

As an example, metering device A1 includes a metering device communication module 110A1 which provides a communication link to network communication device 108. Metering device 110A1 includes a communication module primary clock 112A1 which provides a time reference for metering device communication module 110A1. In operation, the metrology device 114A1 monitors usage and/or gathers time-stamped metering data provided to the meter data management system 106 via the metering device communication module 110A1, the network communication device 108A and the AMI network 102. The metrology device 114A1 connects to at least primary metrology clock 116A1 and optionally to secondary metrology clock 118A1 which provide time information for the metering data. The optional secondary clock is used when the primary clock is otherwise not available. The clocks 112A1, 116A1, 118A1 receive periodic updates in an effort to synchronize them to the atomic time source 104. The time-stamped metering data is transmitted to the meter data management system 106 with a time-stamp based on clocks 112, 116, or 118. The time of the metrology clock 116, 118 is synchronized to the communications module primary clock 112 so that all data has a consistent timing reference. The communications module primary clock 112 is synchronized to the atomic time source 104 so that all data has a consistent timing reference. As a result, the time of the metrology clock 116, 118 is synchronized to the atomic time source 104 via the communications module primary clock 112 so that all data has the same timing reference.

Each component of the architecture as illustrated in FIG. 1 provides several features and/or functions, some of which are optional and some of which contribute to enhance the effectiveness of the architecture. The AMI network 102 keeps time according to the atomic time source 104 and communicates with modules 110. The meter data management system 106 warehouses the meter data as well as validating, editing and estimating meter data. The communication module 110 communicates with the AMI network 102, communicates with the metrology devices 114, keeps time and synthesizes additional metrology values from the metrology source data. The metrology device 114 communicates with communication module 108, meters a commodity (e.g., electric, gas, water), communicates with a user (e.g., a utility providing the commodity), keeps time and communicates with a consumer (e.g., the consumer observes the meter readings).

The communication module 110 and the metrology device 113 usually communicate with a high level protocol. They can send time (of day) information to each other. In some designs, they do not have the means to interdict clock pulses at the hardware level. The adjustment process becomes more complicated when communication modules do more than just communicate. Some modules 110 may provide a value added service such as deriving other time-based "meter data" from the raw metrology data. In this case, the communication module develops a sensitivity to time errors just as significant as the metrology device. The communications module must obey the same rules as the metrology device. The communications module however can "interdict" its own clock pulses to modify time in a gradual manner, according to the adjustment processes as specified herein.

As used herein, the following terms have the following meaning.

Accuracy Class—a nameplate accuracy with which a metrology device captures data.

Clock Jitter—an amount of variation (error) that occurs in the transmission of time from a sender to a receiver.

Clock Skew—a difference in clock rates between two systems.

Clock Tick—The unit of measure used by the clock hardware to measure time. Some designs may use millions of clock ticks per second. Other designs may only generate hundreds of clock ticks per second.

Smallest Interval of Interest (SRN)—A predefined, user defined amount of time which refers to the smallest interval of time which has significance to the user of metering information provided to the user by a metrology device. In some embodiments, a typical value is about 5 minutes or about 15 minutes.

Largest Allowable Clock Change (LACC)—A predefined largest amount of time by which the clock of a metrology device may be changed without violating the nominal accuracy of the reading. The largest allowable clock change is a function of the accuracy class of the metering device and the SIOI of the metrology device. The SIOI is used along with the built-in accuracy class of the metrology device to arrive at the LIOI. For example, if a metrology device were built to provide an accuracy of 0.2%, then LIOI*AC=60*0.002=0.12 minutes (i.e., 7.2 seconds) becomes significant as the LACC.

Largest Interval of Interest (LIOI)—A predefined, user defined amount of time which refers to the largest interval of time which has significance to the user of metering information provided to the user by the a metrology device. In some embodiments, a typical value is about 60 minutes.

Slew Rate—A dimensionless quantity that indicates a rate of change in time over time.

The Smallest Interval Of Interest (SIOI) occurs multiple times within a larger Largest Interval Of Interest (LIOI). It is possible that as time progresses, that the time adjusting process would leave one interval and enter another. The process also could simultaneously enter both the start of the SIOI and the start of the LIOI. These terms are abstractions; as an example the SIOI may be 15 minutes, and the LIOI may be 60 minutes so that, the top of an hour, it could be the start of a new hour as well as the start of a new quarter-hour period of time.

It should be noted that some communication modules 110 provide more than communications. For example, such modules may provide value added services which perform calculations on the raw metrology data. In some modules, "demand" and "interval data" are computed from raw data. In such modules, the application being executed by its processor takes on a sensitivity to the clock changes which is similar to the sensitivity to clock changes of the metrology devices 114.

As used herein, the reference time clock will frequently be referred to as the atomic clock 104 and vice versa. However, it is understood that any authoritative source may be used as a reference time clock. For example, the module clocks 112, 115 may be used by the metrology device 114 as a time reference is another reference is unavailable. As another example, the metrology clocks 116, 118 may be used by the communications module 110 as a time reference is another reference is unavailable.

According to at least one aspect of the invention, time adjustments between the various clocks are made in light of constraints that are not applicable to other multiple clock architectures. There are numerous hardware relationships which are possible in which first clock is a "sender" and one or more other clocks are a "receiver." A "sender" is a clock that is used as a reference or a source of time whereas a "receive?" is a clock which is adjusted as a function of a "sender" clock. These scenarios are described throughout this document in separate sections. For example, the following Table 1 illustrates various sender and receiver relationships according to the invention as illustrated in FIG. 1 (the numbers in Table 1 are reference characters from FIG. 1).

TABLE 1

Sender/Receiver Relationships

| Scenario | SENDER | RECEIVER |
|---|---|---|
| 1 | atomic time source 104 | comm. module primary clock 112 or comm. module secondary clock 115 via AMI network 102 |
| 2 | comm. module primary clock 112 or comm. module secondary clock 115 | metrology primary clock 116 via metrology device 114 |
| 3 | comm. module primary clock 112 or comm. module secondary clock 115 | metrology secondary clock 118 via metrology device 114 |

TABLE 1-continued

Sender/Receiver Relationships

| Scenario | SENDER | RECEIVER |
|---|---|---|
| 4 | metrology primary clock 116 | metrology secondary clock 118 via metrology device 114 |
| 5 | metrology primary clock 116 | comm. module primary clock 112 or comm. module secondary clock 115 via metering device comm. module 110 |
| 6 | metrology secondary clock 118 | comm. module primary clock 112 or comm. module secondary clock 115 via metering device comm. module 110 |
| 7 | metrology secondary clock 118 | metrology primary clock 116 via metrology device 114 |
| 8 | atomic time source 104 | another atomic time source |

Clocks are updated through a formal exchange of time stamp information. In the following discussion, the module 110 will be used as an example of a sender or receiver to illustrate the various aspects of various embodiments of the invention. However, it should be understood that any time keeping module may use any of the various aspect of the invention. In some embodiments, the module 110 is the sender and the processor 113 of the module 110 provides data to adjust a receiver clock based on one of the module clocks 112, 115. For example, scenarios 2 and 3 illustrate the module 110 providing adjustments to the metrology clocks 116, 118.

In other embodiments, the metrology device 114 is the sender and a processor of the metrology device 114 provides data to adjust a receiver clock based on one of the metrology clocks 116, 118. For example, scenarios 4 and 7 illustrate the metrology device 114 providing adjustments to its own clocks 116, 118 whereas scenarios 5 and 6 illustrate the metrology device 114 providing adjustments to its module clocks 112, 115. In some embodiments, the processor 113 of the communication module 110 makes direct adjustments to a metrology clock's time when both are viewed as the same system. When operated as separate systems, the processor 113 of the communication module 110 changes the time in the metrology device 114 by informing it or commanding it to accept a new time of day. These updates are passed over the same ports P that carry the metrology data (only flowing in the other direction). Time updates flow from the module 110 and into the metrology device 114. Metrology data flows from the metrology device 114 into the module 110. As used herein, it will be noted that one device or one clock adjusts or corrects the time of another device or another clock. This is intended to mean that a processor of one device provides information or commands to a processor of another device to directly or indirectly adjust the clock of the another device. In other embodiments, each device may be self-correcting in that each device corrects its own clock based on time information obtained from another clock or another device. Either the sender or the receiver may be self-correcting.

It is also contemplated that the time stamp information provided by a sender to a receiver may be adjusted to accommodate parameters or limitations of the receiver. In certain scenarios, the sender may not necessarily send unadjusted time stamp data to the receiver. In such scenarios, sending unadjusted data to the receiver would cause the receiver to make a time correction to match a reference time and which would corrupt or compromise its data. Instead, the sender would send an adjusted time stamp data to the receiver which would cause the receiver to make an incremental time correction which would approach a reference time and which would prevent or minimize corruption or compromise of its data. In summary, it is contemplated that the communications module 110 and the metrology device 114 may be self-correcting or that the communications module 110 may correct clocks of the metrology device 114 or that the metrology device 114 may correct clocks of the communications module 110. In particular, the first metrology device 114 may provide clock adjustments for its metrology clocks 116, 118; the first metrology device 114 may provide clock adjustments to the first communications module 110 for the module clocks 112, 115; the first communications module 110 may provide clock adjustments for its module clock 112, 115; and/or the first communications module 110 may provide clock adjustments to the first metrology device 114 for the metrology clocks 116, 118. For convenience, the description herein is directed to the module as a sender correcting a receiver or self-adjusting its time. Similarly, the metrology device may be a sender correcting a receiver or self-adjusting its time.

Although the diagram of FIG. 1 illustrates the communications module 110 and metrology device 114 as separate blocks, it is contemplated that the module 110 and device 114 may be one integrated apparatus sharing components, such as a shared processor.

Figure 2:
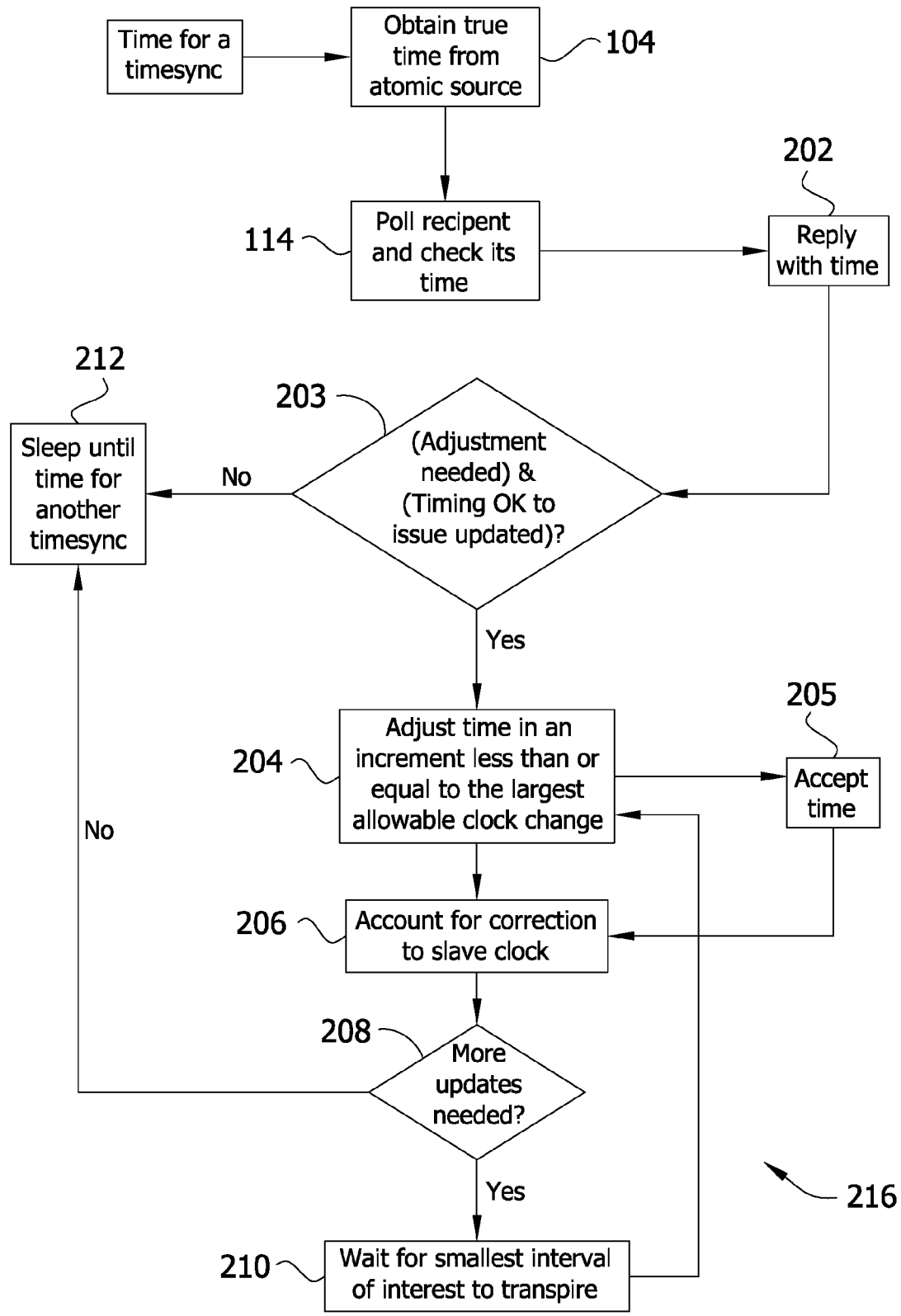
FIG. 2 illustrates an activity diagram of processor executed instructions according to one embodiment for incremental time adjustment when the communication module is not sensitive to time adjustments but the receiver is sensitive to such adjustments.
Figure 3:
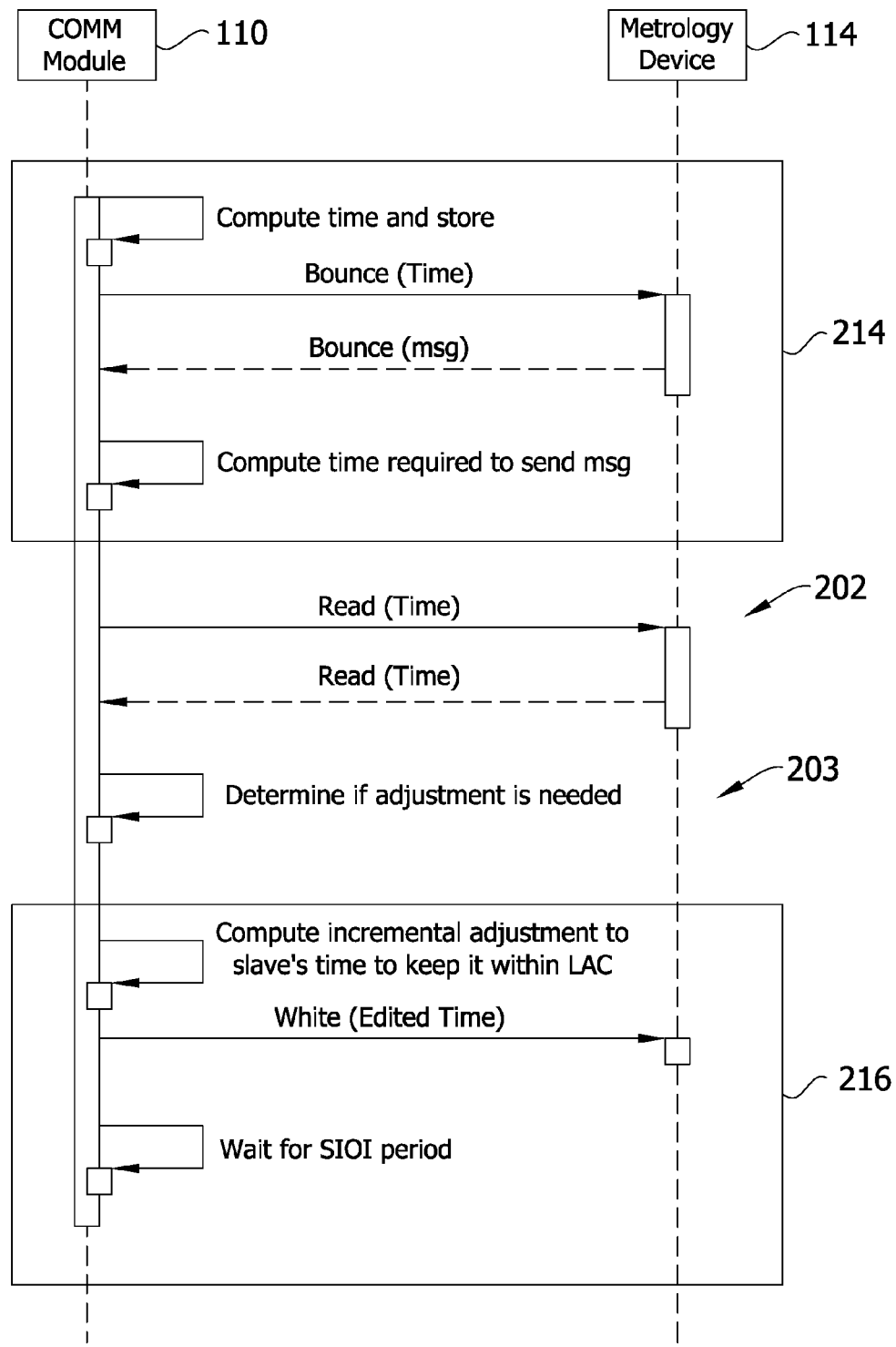
FIG. 3 illustrates a sequence diagram according to one embodiment for incremental time adjustment when the communication module is not sensitive to time adjustments but the receiver is sensitive to such adjustments.
Figure 4:
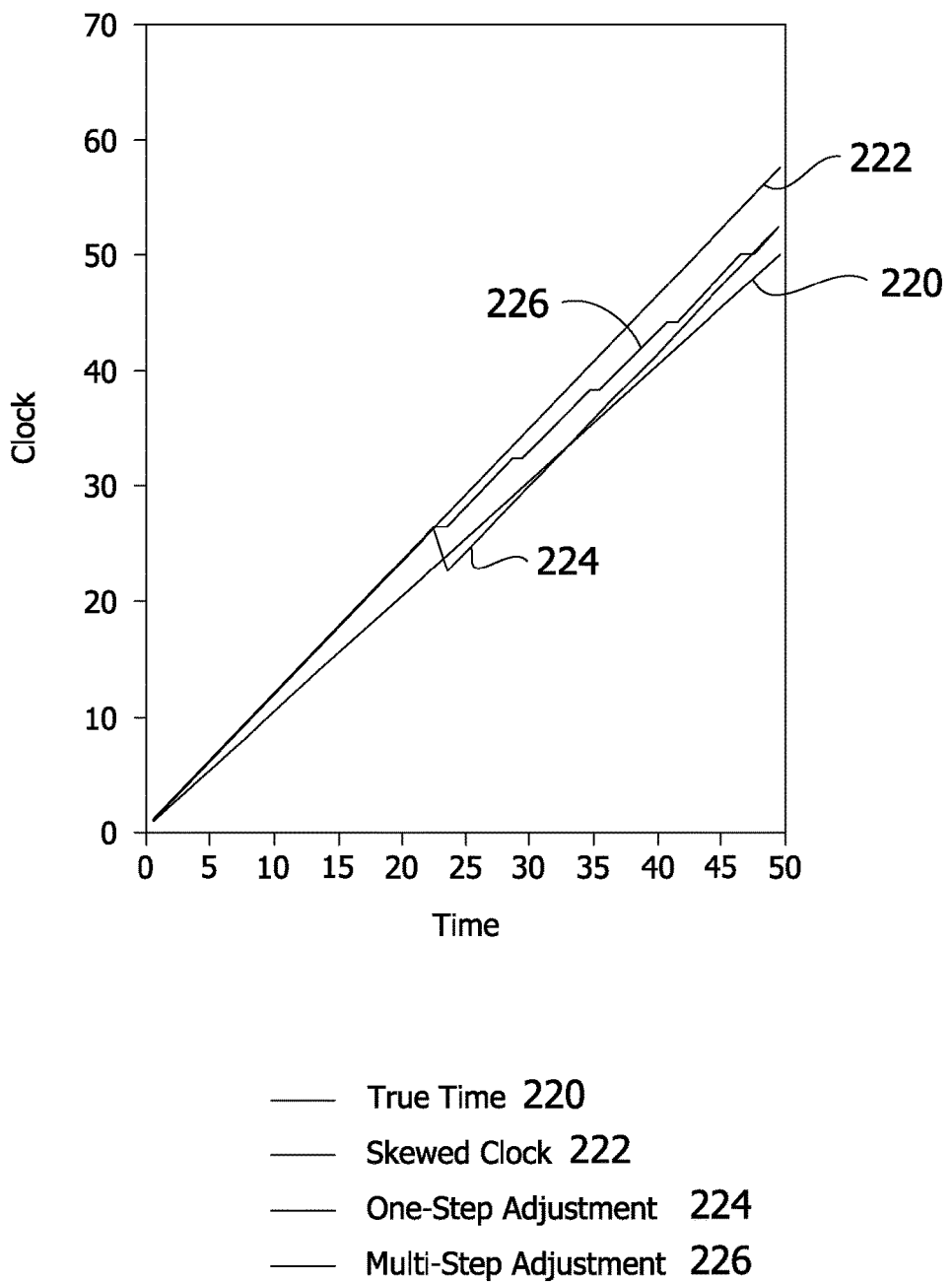
FIG. 4 is a graph illustrating various clock adjustment alternatives according to one embodiment when the communication module is not sensitive to time adjustments but the receiver is sensitive to such adjustments. Clock is along the y-axis and Time is along the x-axis.

FIGS. 2-4: Communication Module 110 (Sender) is not Sensitive to Time Changes, but the Metrology Device 114 (Receiver) is Sensitive to Time Changes.

FIG. 2 illustrates an activity diagram for incremental time adjustment of the metrology device 114 by the communications module 110, FIG. 3 illustrates a sequence diagram for the incremental time adjustment, and FIG. 4 is a graph illustrating various clock adjustment alternatives when the communication module 110 is not sensitive to time adjustments but the receiver (metrology clock 116, 118) is sensitive to such adjustments.

If the component collecting the data is a meter such as metrology device 114, and if the device 114 has a known Accuracy Class and a Smallest Interval Of Interest (SIOI) stored in the processor 113, then the processor can predefine the Largest Allowable Clock Change (LACC) to the clock 116, 118 of the device 114 by determining the LACC based on the accuracy class and SIOI. Alternatively or in addition, the SIOI and/or the LACC can be predefined and the predefined SIOI and/or LACC can be stored in the memory of the metrology device and provided to the processor 113 via its port P connected to the metrology device 114. Alternatively or in addition, the SIOI and/or the LACC can be predefined, such as from Table 2, below, and the predefined SIOI and/or LACC can be stored in the processor's memory. As shown in FIGS. 2-4, an interrupt service routine as illustrated in FIGS. 2-4 executed by a processor of the metering device communications module 110 sends out timestamps to its clocks 116, 118 with minor adjustments every smallest interval of interest (SIOI), according to one embodiment. The adjustments must be kept smaller than the LACC for the metrology device 114.

Referring to FIG. 2, if a time adjustment is needed as determined at 203 after receiving a reply with time at 202, if the clock error is significant enough to warrant a time change, then the clocks 116, 118 are adjusted in increments of less than or equal to the LACC at 204. Whether the clock error is significant enough to warrant a time change is left to the discretion of the implementer. If the error is immeasurably small, the clock can be left alone in the hope that the clock drift will naturally correct it. If, however, the clock error exceeds the LACC, it should probably be corrected. In one embodiment, the adjustments are made by the processor of the metrology device 114 in response to commands from the processor of the communications module 110. The communications module primary clock 112 is synchronized to the atomic time source 106. As a result, the metrology clocks 116, 118 are corrected and relatively synchronized to atomic time source 106.

After the time is accepted at 205 and after accounting for correction to the clocks at 206, it is determined at 208 by the processor of the communication module 110 whether more updates are needed to the metrology clocks 116, 118. If needed, module 110 waits until the SIOI transpires at 210 before the next adjustment at 204. In general, the sending system (e.g., module 110) can make an adjustment to its clock while trying to adjust a slave's clock (e.g., clocks 116, 118) to another time. However, the SIOI rhythm must not be disturbed when sending updates to the slave clock, and the updates must be less than the LACC. If an adjustment is not needed at 202, or if the timing does not permit an update to issue at 202, or if no more updates are needed at 208, the clock maintenance function running at module 110 waits in a "sleep" mode at 212 until it is time for another time synchronization event. As illustrated in FIG. 3, the sequence diagram between the communication module 110 and the receiver device 114 includes an optional loop 214 to compute transmission time between the module 110 and the device 114. Thereafter, a determination is made at 201 by the module 110 as to whether an adjustment is needed. If needed, a loop increment adjustment is executed at 216 including operations 204, 206, 208 and 210 to adjust the clock 116, 118 of the metrology device 114. FIG. 4 illustrates a comparison of the true time 220 from the atomic time source 104 and a skewed clock 222 of a device 114 and shows the results of a one-step adjustment 224 and a multi-step adjustment 226. The clock update rate (along the x axis) is a function of a largest interval of interest (LIOI) and the accuracy class of the meter. The LIOI may be predefined and stored in the memory of the processor 113 and/or the memory of the metrology device 114 and provided to the processor 113. The clock update amount (along the y axis) is a function of the SIOI, the accuracy class of the meter, and the error that the module 110 has developed.

It is possible, with minor clock adjustments occurring within each SIOI, to maintain the clock time of clock 116, 118 with some resolve. For example, it was found that a power line frequency could be maintained by the California Independent System Operator (CAISO) so that customer's clocks would not be allowed to drift more than 5 seconds from atomic time during the day. In this example, corrections could be made during the night to compensate for any error and thus keep the clocks running true. With clocks 112 and/or 118 using the power line frequency as their time source, just like a customer's wall-clock might, the metrology time can be maintained to the same accuracy. As we see however in Table 2 below, only special cases of metrology can tolerate 5 seconds of error (see the "Largest Allowable Clock Change per SIOI" column). A safer course of action is for the hardware to always make minor corrections gradually applied during the course of the day to avoid destruction of the data.

The following describes the calculations for a clock adjustment when the communication module 110 is not sensitive to time adjustments but the receiver (metrology clock 116, 118) is sensitive to such adjustments. The NominalClockSlewRate is always known by the clock hardware. It is a function of some hardware design. Preferably, the source of clock ticks runs true at a rate faster than 1 kHz, though it may be possible to design a system that leverages a reliable source at 100 or 120 Hz.

Equations 1-7, below, illustrate clock adjusts by a communication module 110 that is time sensitive and is not able to adjust a clock slew rate of a clock 116, 118 of a metrology device (receiver) 114.

Define the Nominal Clock Tick Frequency:

$$NominalClockTickFrequency = NominalNumberOfClockTicksPerSecond \quad \text{(eq. 1)}$$

Then, $$NominalTimeRate = \frac{1}{NominalClockTickFrequency} \quad \text{(eq. 2)}$$

Time is a value measured against the epoch of midnight. Each day starts at midnight with a time value of 00:00:00.000. The running time throughout the day is the clock tick counter times the NominalTimeRate so that the calculation of time from clock ticks is:

$$Time_{seconds} = Clock_{TICKS} \times NominalTimeRate \quad \text{(eq. 3)}$$

"Clock ticks" are used by the hardware as the unit of measure for time. "Seconds" are used by humans to express time.

The ClockChangeBudget$_{SIOI}$ value then defines the amount in seconds by which the clock time may be changed, should changes be needed to cause the clock to agree with true day:

$$LACC_{TICKS} = LACC_{SIOI} \times NominalTimeRate \quad \text{(eq. 4)}$$

The LACC$_{TICKS}$ represents the maximum allowable amount by which the time in the clock may be changed using the unit of measure appropriate for the clock (clock ticks).

As a result, the needed clock adjustment in ticks is:

$$NeededClockAdjustment_{TICKS} = (TrueTime - ClockTime) \times NominalTimeRate \quad \text{(eq. 5)}$$

(Where "true time" and "clock time" are values expressed in seconds, and the "NeededClockAdjustment" is a value expressed in clock ticks.)

The allowable clock adjustment in ticks is:

$$ClockAdjustment = \quad \text{(eq. 6)}$$
$$\begin{cases} \text{if}(|NeededClockAdjustment| \leq ClockChangeBudget_{TICKS}) \\ \quad \text{then use } NeededClockAdjustment_{TICKS} \\ \text{if}(NeededClockAdjustment_{TICKS} > ClockChangeBudget_{TICKS}) \\ \quad \text{then use } ClockChangeBudget_{TICKS} \\ \text{if}(NeededClockAdjustment_{TICKS} < -ClockChangeBudget_{TICKS}) \\ \quad \text{then use}(-ClockChangeBudget_{TICKS}) \end{cases}$$

Where CLOCKCHANGEBUDGET$_{TICKS}$ is LACC$_{TICKS}$.

Figure 10:
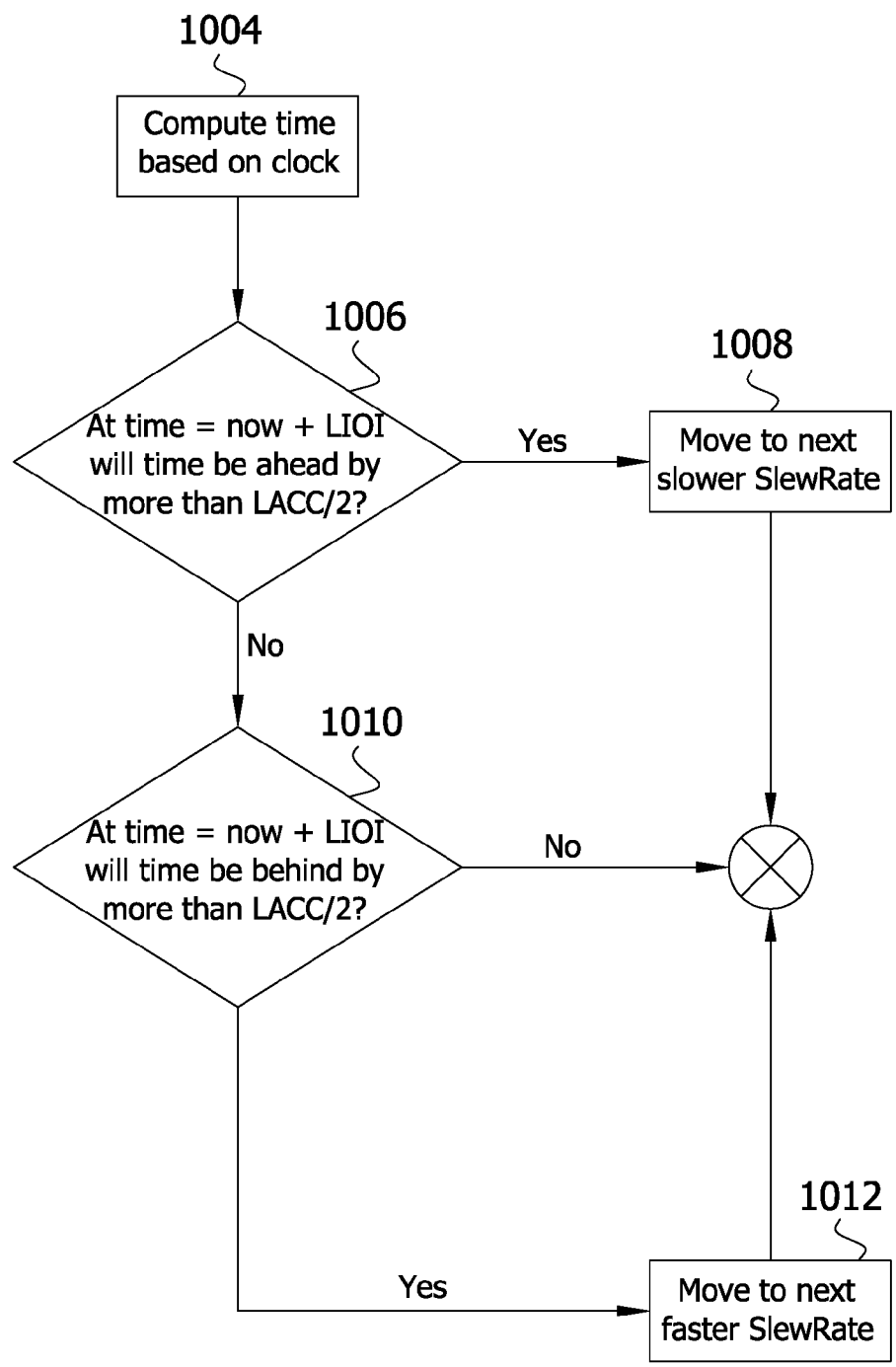
FIG. 10 illustrates an activity diagram of processor executed instructions according to one embodiment for incremental time adjustment wherein the clock uses a pre-computed family of slew rate curves for time adjustments.

At an appropriate moment, within each SIOI for a given LIOI, the current clock of the metrology device 114 would be adjusted with multiple minor clock adjustments as described in FIG. 10 (multi-step adjustment), and by Equation 7:

$$Clock_{TICKS} = Clock_{TICKS} + ClockAdjustement_{TICKS} \quad \text{(eq. 7)}$$

While this Eq. 7 implies that the clock tick counter is merely changed arithmetically, another approach is to increase or decrease the count that it would otherwise have by interdicting at the pulse source.

Pulse Source Interdiction

While the clock slew rate might be fixed, it still may be possible to make subtle adjustments to the tick counter which do not stand out as significant, yet suffice to correct the error. This is discussed below.

Communication Module 110 (Sender) is Time Sensitive and is Able to Adjust its Clock 112 Slew Rate:

In this self-adjusting embodiment, clock slew rate adjustments for the communication module 110 are adjusted to track true time (e.g., the atomic time source 104) for a communication module 110 which is time sensitive and capable of adjusting its clock slew rate. In this embodiment, a timestamp is send by the atomic time source 104 to the communication module 110, which records the clock value and the time sync message data. Next, the module 110 computes the rate of true time slew and the adjustments needed to track it.

Different metrology applications have different needs. Many of these needs are based on tariffs. Other needs are based on the resolution required by a process being measured. A given meter may be installed to support multiple interests. The application with the smallest interval of time (whether it be one hour or one minute) is an important consideration. In this document this interval is called the "Smallest Interval Of Interest" (SIOI). According to one embodiment, the SIOI, together with the accuracy class of the meter, sets the criterion for the Largest Allowable Clock Change (LACC).

In response, there are several approaches that can be taken to correct the clock. For example, there are at least two ways an algorithm can get into trouble and violate the largest allowable clock change (LACC) for a given meter (see Table 2, below). First, adjustments to the clock time can be so large that they affect the integrity of the data collected. The remedy is to take the desired clock change and spread out the changes across time if the desired clock change is larger than a preset adjustment (stored in a memory of the processor 113 or the metrology device 114) which affects an integrity of the metering information. If the adjustments to time do not violate the needs of the smallest interval of interest (SIOI), then the larger intervals will not be violated either. The constraint on clock time adjustments therefore is found in satisfying the needs of the smallest interval of interest. Second, adjustments to the slew rate essentially "re-baseline" the way the clock runs. If the smallest interval of interest (SIOI) is used as the basis to re-baseline the clock, it will cause fairly aggressive tracking of the true clock slew rate, but may also stack up corrections which over time violate the limits of one of the larger intervals of interest. In this case, the largest interval of interest (LIOI) is identified and used to govern the periodicity in which the clock slew rate may be adjusted.

Table 2 illustrates various accuracy classes according to one embodiment showing largest allowable clock change for each class:

TABLE 2

LARGEST ALLOWABLE CLOCK CHANGE (LACC) PER ACCURACY CLASSES

| Accuracy Class (AC) | Smallest Interval Of Interest (SIOI) in minutes | Largest Allowable Clock Change (LACC) per SIOI (in seconds) | Largest attainable clock change between 15 min time syncs (in seconds) | Largest attainable clock change per hour (in seconds) | Largest attainable clock change per month (in minutes) |
|---|---|---|---|---|---|
| 2.00% | 60 | 72 | 18 | 72 | 36 |
| | 30 | 36 | 18 | 72 | 36 |
| | 15 | 18 | 18 | 72 | 36 |
| | 12 | 14.4 | 18 | 72 | 36 |
| | 10 | 12 | 18 | 72 | 36 |
| | 5 | 6 | 18 | 72 | 36 |
| | 1 | 1.2 | 18 | 72 | 36 |
| 1.00% | 60 | 36 | 9 | 36 | 18 |
| | 30 | 18 | 9 | 36 | 18 |
| | 15 | 9 | 9 | 36 | 18 |
| | 12 | 7.2 | 9 | 36 | 18 |
| | 10 | 6 | 9 | 36 | 18 |
| | 5 | 3 | 9 | 36 | 18 |
| | 1 | 0.6 | 9 | 36 | 18 |
| 0.50% | 60 | 18 | 4.5 | 18 | 9 |
| | 30 | 9 | 4.5 | 18 | 9 |
| | 15 | 4.5 | 4.5 | 18 | 9 |
| | 12 | 3.6 | 4.5 | 18 | 9 |
| | 10 | 3 | 4.5 | 18 | 9 |
| | 5 | 1.5 | 4.5 | 18 | 9 |
| | 1 | 0.3 | 4.5 | 18 | 9 |
| 0.20% | 60 | 7.2 | 1.8 | 7.2 | 3.6 |
| | 30 | 3.6 | 1.8 | 7.2 | 3.6 |
| | 15 | 1.8 | 1.8 | 7.2 | 3.6 |
| | 12 | 1.44 | 1.8 | 7.2 | 3.6 |
| | 10 | 1.2 | 1.8 | 7.2 | 3.6 |
| | 5 | 0.6 | 1.8 | 7.2 | 3.6 |
| | 1 | 0.12 | 1.8 | 7.2 | 3.6 |
| 0.10% | 60 | 3.6 | 0.9 | 3.6 | 1.8 |
| | 30 | 1.8 | 0.9 | 3.6 | 1.8 |
| | 15 | 0.9 | 0.9 | 3.6 | 1.8 |
| | 12 | 0.72 | 0.9 | 3.6 | 1.8 |
| | 10 | 0.6 | 0.9 | 3.6 | 1.8 |
| | 5 | 0.3 | 0.9 | 3.6 | 1.8 |
| | 1 | 0.06 | 0.9 | 3.6 | 1.8 |

The above discussion assumes the following:
1. There are relatively long periods of time between time syncs relative to the amount of adjustment that must be made.
2. Time syncs finish their arrival precisely at the time indicated in their timestamp.
3. There are no significant or unpredictable delays in the transmission (and receipt) of the time sync message.
4. In order to reduce programming and test complexity in one embodiment, the timekeeping algorithm may select the smallest known interval as the SIOI and the largest known interval as the LIOI. The algorithm may perform clock corrections per these constraints (while ignoring all interval sizes between the largest and smallest.) The outcome will be the same. By default, the SIOI may be considered to be one minute, and the LIOI may be considered to be one hour.
5. The SIOI is an integer multiple of the LIOI (e.g. with LIOI=60 min, and SIOI=5, LIOI/SIOI=12.)
6. The SIOI boundaries are aligned with the LIOI boundaries (with regard to interval data).
7. Time sync jitter is negligible.
8. Clock jitter is negligible.

FIGS. 5-10, Communication Module 110 (Receiver) Performs Time-Dependant Calculations on Raw Metrology Data and Adjusts its Clock 112 Slew Rate to Conform to True Time Slew Rate and to Introduce Minor Clock Adjustments:

First, self-adjustments are made to the slew rate of clock 112 to get it to run true. During this phase, adjustments are made so that one clock second equals one true-time second. After the slew rate is considered reasonably close, then adjustments are made to the clock time. In both cases, safeguards are put in place to ensure that large changes do not occur which could violate the accuracy class of the meter.

Figure 5:
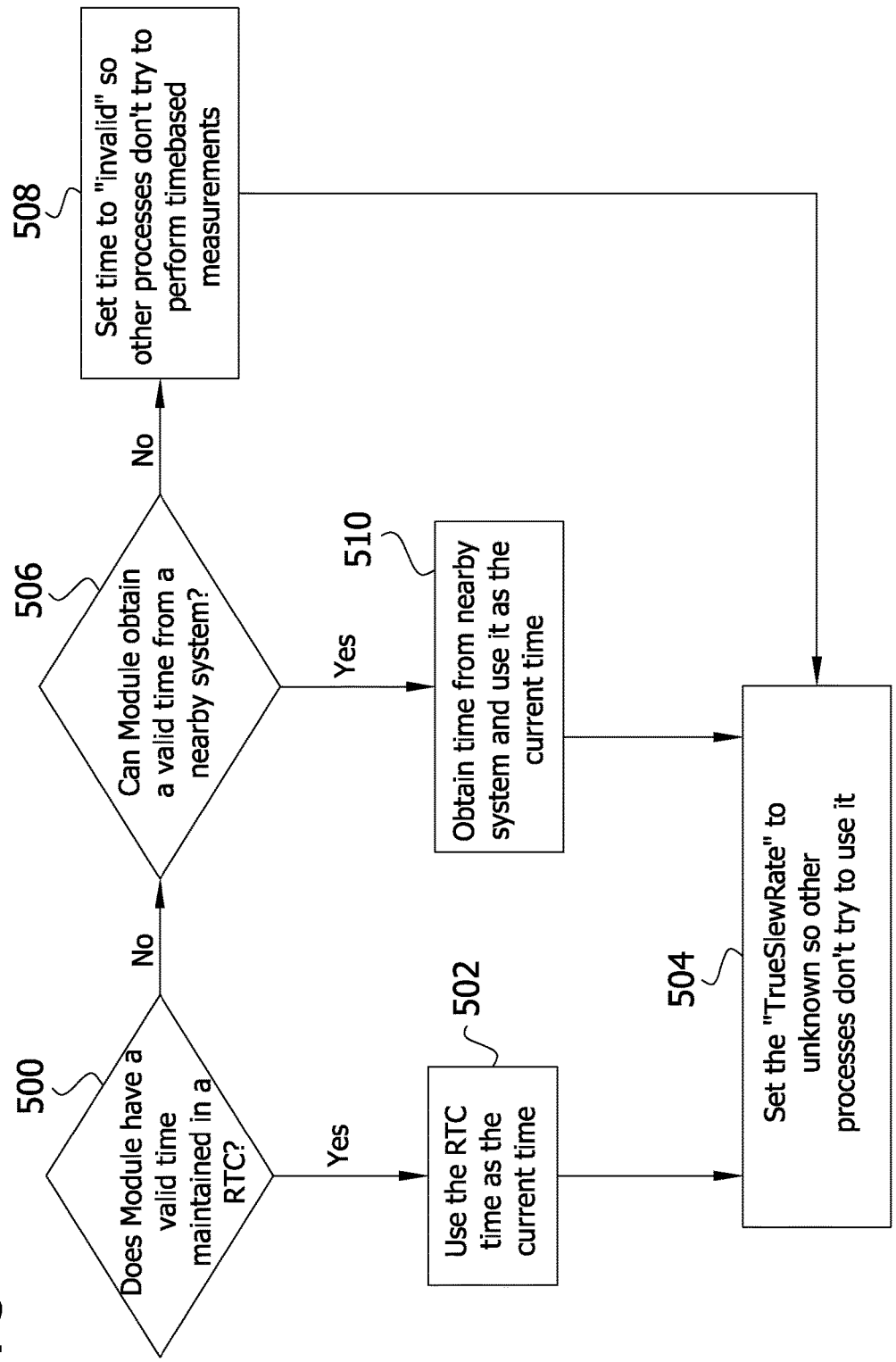
FIG. 5 is an activity diagram of processor executed instructions illustrating processing of time during a power-up for a communication module that is time sensitive and is capable of adjusting its clock slew rate according to one embodiment.

FIG. 5 is an activity diagram illustrating processing of time during a power-up for communication module 110 that is time sensitive and is capable of adjusting its clock 112 slew rate. At 500, the module 110 checks to see if it has a valid time in a battery-backed real time clock (e.g., secondary clock 115). If so, the time is used at 504 and the slew rate is set to unknown so that other processes do not use it. If not, the module 110 checks for a valid time from another source at 506. If there is no other source, the time is set to invalid so that other processes do not use it. If there is another source, it is used at 510 to obtain time.

Figure 6:
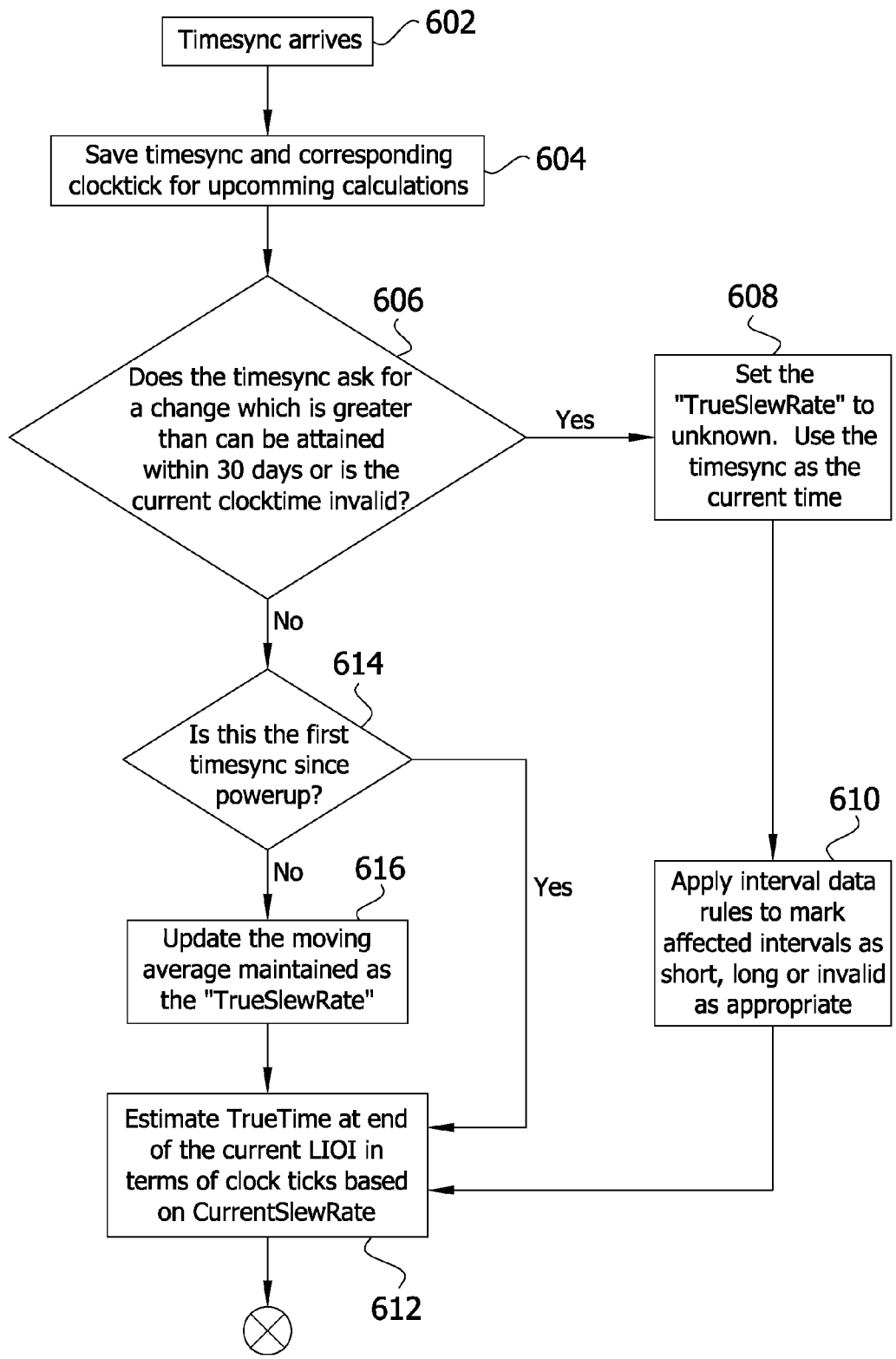
FIG. 6 is an activity diagram of processor executed instructions illustrating processing of processing of time sync information by a communication module that is time sensitive and is capable of adjusting its clock slew rate according to one embodiment.

FIG. 6 is an activity diagram illustrating processing of time sync information by communication module 110 that is time sensitive and is capable of adjusting its clock 112 slew rate. At 602, the module 110 receives time sync information and saves it at 604 along with the corresponding clock tick, for use in calculating the adjusted slew rate. At 606, the module 110 evaluates the time sync information. Does the information require a change which is greater than can be attained within 30 days? Alternatively, is the current clock time invalid? If the answer is YES to either question, then the true slew rate is set to unknown at 608, the interval rules are applied at 610 and the true time is estimated at the end of the current LIOI (largest interval of interest) in terms of clock ticks based on the current slew rate at 612. If the answer to both questions is NO, the module 110 determines at 614 whether the time sync information is the first time sync information since power-up of the module. If so, the module proceeds to 612. If not, the moving average stored as the true slew rate of the module is updated at 616 and the module proceeds to 612. At 612, the true time is estimated at the end of the current LIOI in terms of clock ticks based on the current slew rate.

In FIG. 6, it should be noted that, if the module 110 had a date and time in a secondary clock 115, but not in its primary clock 112, then it should have loaded time from the secondary clock 115 and used it at power-up.

Figure 7:
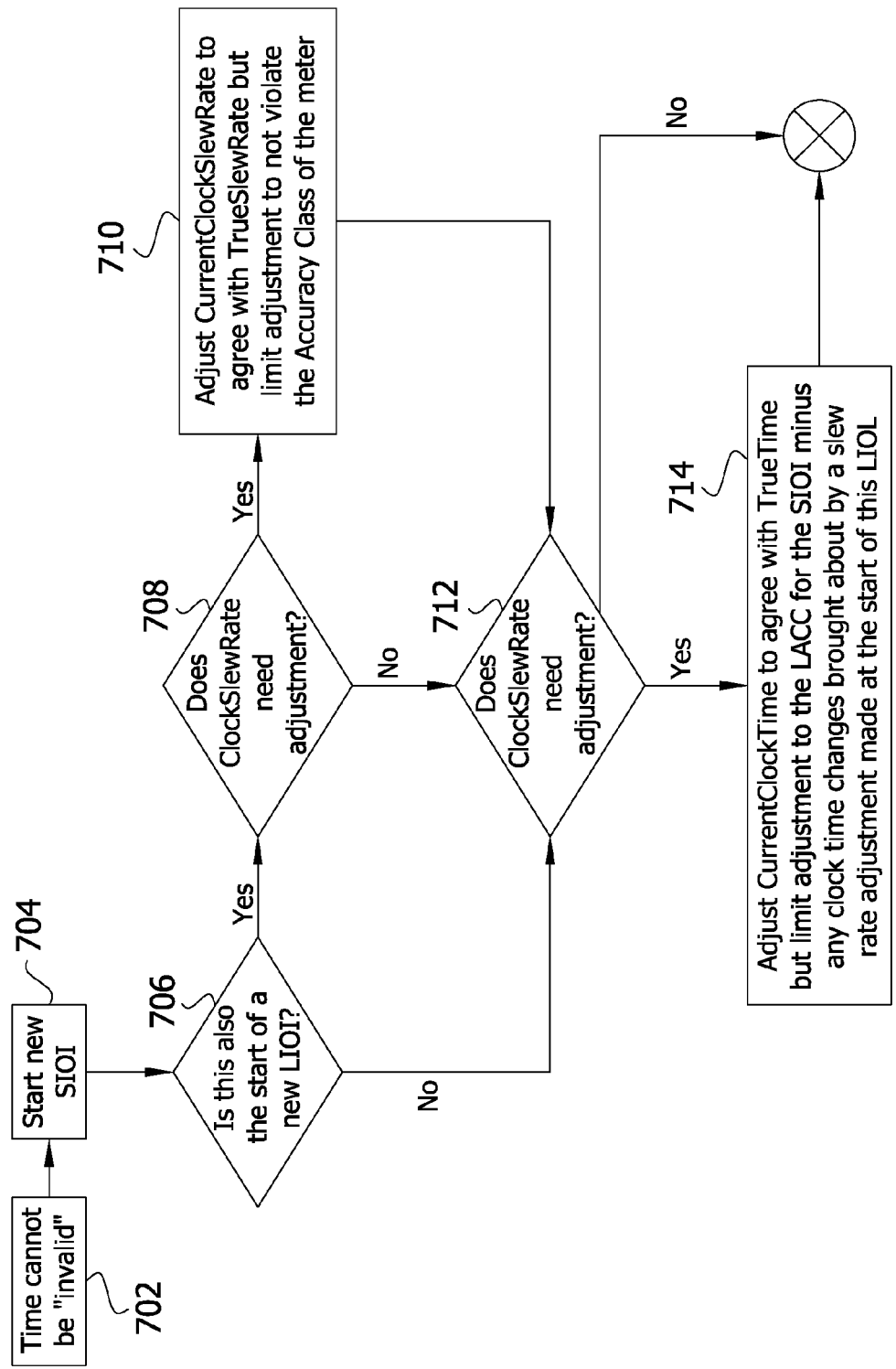
FIG. 7 is activity diagram of processor executed instructions according to one embodiment for a communication module that is time sensitive and is capable of adjusting its clock slew rate.

FIG. 7 is an activity diagram for communication module 110 that is time sensitive and is capable of adjusting its clock 112 slew rate. As time progresses, the clock will leave one SIOI period and enter a new SIOI time period. It will also periodically enter a new LIOI time period. For example, if the user has identified the SIOI as 15 minutes, and the LIOI as one hour, then at the top of every hour, the clock will leave the end of one SIOI time period (e.g., the end of one quarter hour period), and enter a new SIOI period (e.g., a new quarter hour period) as well as a new LIOI period (e.g., the start of a new hour). If the time starts a new smallest interval of interest (SIOI) period at 704. If this calculation is also the start of a new largest interval of interest (LIOI) at 706, the module 110 proceeds to 708 to determine if the slew rate needs adjusting. If so, it is adjusted within the rules to agree with the true slew rate at 710 and the module proceeds to 712. If at 706, the calculation is not the start of a new largest interval of interest (LIOI) or if at 708 the slew rate does not need adjusting, the module also proceeds to 712. At 712, the module determines if the clock slew rate continues to need adjustment. If not, the process ends. If so, the module proceeds to 714 to adjust the current time clock to agree with the true time within limits. At 714, the module effectively spreads minor clock time adjustments over time within every smallest interval of interest (SIOI) time period, as needed.

In FIG. 7, adjusting the clock slew rate at 710 effectively re-baselines the clock's timekeeping function every largest interval of interest (LIOI). Clock slew rate adjustments could also impact clock time. The largest interval of interest (LIOI) budget can be used for both but never exceeded. The LIOI can be viewed by the timekeeping process as a "budget" which may be spent (allocated) any number of ways to bring time into correction before the nominal accuracy class of the meter dictates that the changes made to the clock render the data to be considered inaccurate—even if captured by (otherwise) perfectly accurate metrology hardware. The clock change budget is discussed further in [0082].

DEFINITIONS

Time drifts away from the ideal as the time source (sender; module 110) drifts away from the nominal operating frequency. So the current clock tick frequency may differ from the nominal. This distinction calls for a definition of the actual clock slew rate called the "CurrentClockSlewRate."

$$ClockSlewRate \qquad \text{Equation 8}$$
$$CurrentClockSlewRate = \frac{ActualNumberOfClockTicksInLastCompleteSecond}{Second}$$

Note that the SIOI, LIOI, the basis for the ClockSlewRate, and time itself must all be measured in the same fundamental unit of measure. In eq. 1, "seconds" are chosen, but "minutes," "milliseconds," and even "deci-seconds" are viable alternatives. The choice of unit of measure in eq. 1 has a corresponding effect on the units of measure used in other equations such as equation 8. The inverse of the clock slew rate is the clock time rate as seen in equation 9. So while the clock slew rate might be measured in clock ticks per second, the clock time rate would be measured in seconds per clock tick.

$$ClockTimeRate \qquad \text{Equation 9}$$
$$ClockTimeRate = \frac{1}{ClockSlewRate}$$

The allowable change to the slew rate is computed relative to the CurrentClockSlewRate, and may be computed every largest interval of interest (LIOI) period (causing the "CurrentClockSlewRate" to be replaced with a "NewClockSlewRate" every LIOI period until the "TrueSlewRate" is attained.)

The latest time sync is number "n" and the previous time sync is "n−1."

$$TrueSlewRate_n \quad \text{Equation 10}$$

$$TrueSlewRate_n = \frac{\text{Number of clock ticks between } Timesync_n \text{ and } Timesync_{n-1}}{Timestamp_n - Timestamp_{n-1}}$$

If one (or fewer) time syncs have been received since the last power-up (or significant time change from an authenticated source), then:
TrueSlewRate=Invalid
Equation 11—TrueSlewRate with One or Fewer Time Syncs
If two time syncs have been received since the last power-up (or significant time change from an authenticated source), then:
TrueSlewRate=TrueSlewRate$_n$
Equation 12—TrueSlewRate with Two Time Syncs
If three time syncs have been received since the last power-up (or significant time change from an authenticated source), then:

$$TrueSlewRate \text{ with three time syncs} \quad \text{Equation 13}$$

$$TrueSlewRate = \frac{TrueSlewRate_{n-1} + TrueSlewRate_n}{2}$$

If four or more time syncs have been received since the last power-up (or significant time change from an authenticated source), then:

$$TrueSlewRate \text{ with four or more time syncs} \quad \text{Equation 14}$$

$$TrueSlewRate = \frac{TrueSlewRate_{n-2} + TrueSlewRate_{n-1} + TrueSlewRate_n}{3}$$

The clock can be made to generate ticks at the True SlewRate resulting in an accurate time calculation despite the use of the NominalTimeRate in the calculation of time (see Eq. 3).

Figure 8:
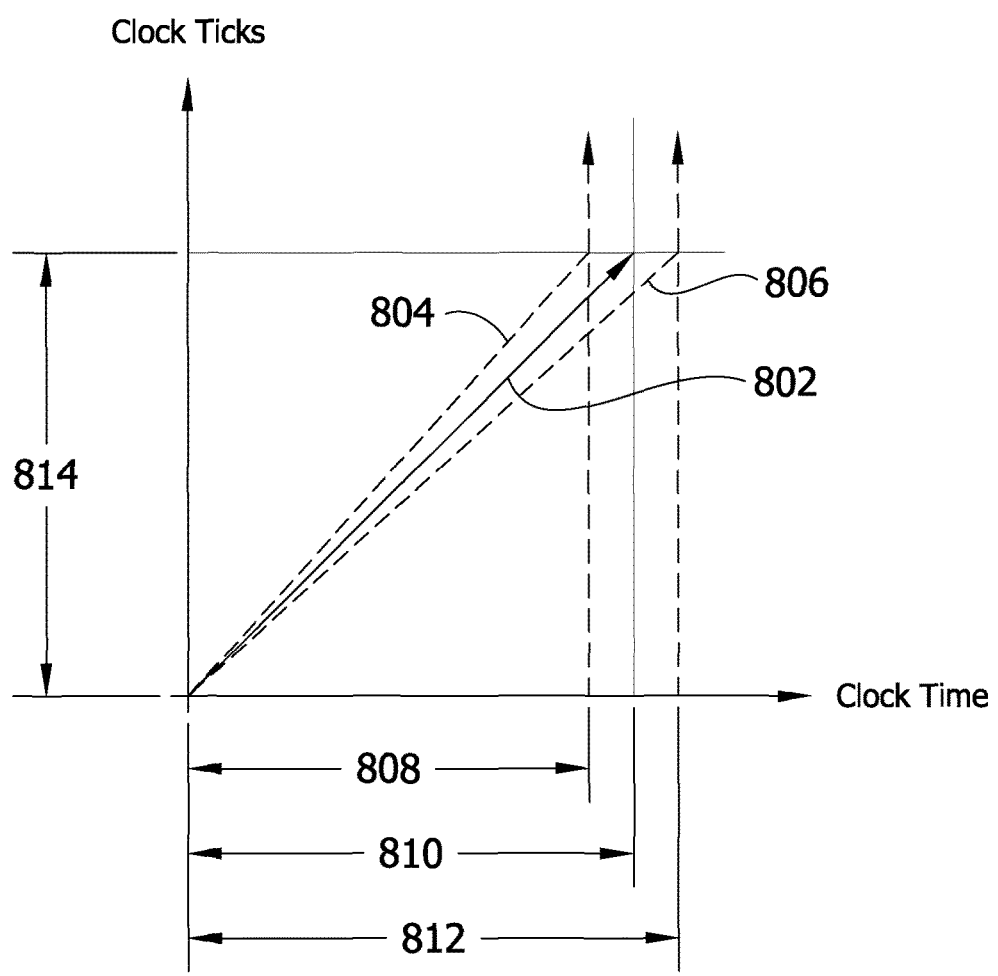
FIG. 8 illustrates a graph of slew adjustment boundaries computed per largest interval of interest (LIOI) for a communication module that is time sensitive and is capable of adjusting its clock slew rate according to one embodiment. Clock Ticks are along the y-axis and Clock Time is along the x-axis.

FIG. 8 illustrates slew adjustment boundaries computed per LIOI for a communication module 110 that is time sensitive and is capable of adjusting its clock slew rate. Note that the diagram (FIG. 8) shows the calculation of the allowable boundaries being done against an authoritative source for clock time along the x-axis. The clock tick count is measured along the y-axis. In such illustrations, an update rate (or the period of time that must elapse before significant updates are made) can be measured along the "x axis" and the update rate=LIOI*(1−AC). Thus, the update rate is a function of the LIOI as well as the accuracy class. The update amount however is limited by another constraint: the LIOI, i.e., LACC=SIOI*AC. As a result, the update amount is a function of the SIOI as well as the accuracy class. Knowing both the update rate and the update amount allows periodic corrections to time to bring the clock into agreement with "true time." As the module makes corrections to the metrology clock (or whichever clock is being adjusted), the "true time" is considered an idealized time. The metrology clock cannot be immediately and necessarily forced to correspond with the true time in every scenario because certain scenarios would damage the metering data. Thus, the metrology clock is adjusted slowly to approach the correct or true time. In other words, the communication module 110 adjusts the time of the metrology clock 116/118 slowly (gradually) to the correct or true time.

In FIG. 8, line 802 is the current clock slew rate. Line 804 illustrates the slew rate increase upper boundary in one largest interval of interest (LIOI). Line 806 illustrates the slew rate decrease lower boundary in one largest interval of interest (LIOI). Period 808 is the largest interval of interest (LIOI) multiplied by 1 minus its accuracy class (LIOI*(1−AC). Period 810 is the largest interval of interest (LIOI). Period 812 is the largest interval of interest (LIOI) multiplied by 1 plus its accuracy class (LIOI*(1+AC). Clock ticks 814 correspond to the clock tick delta over the largest interval of interest (LIOI).

$$ClockSlewRateUpperBoundary \quad \text{Equation 15}$$
$$\text{(relative to } CurrentClockSlewRate\text{)}$$
$$ClockSlewRateUpperBoundary = \frac{CurrentClockSlewRate}{(1 - AC)}$$

$$ClockSlewRateLowerBoundary \quad \text{Equation 16}$$
$$\text{(relative to } CurrentClockSlewRate\text{)}$$
$$ClockSlewRateLowerBoundary = \frac{CurrentClockSlewRate}{(1 + AC)}$$

Business Rules for Calculation of Slew Rate Adjustment

First, the current ClockSlewRate is saved as the OldClockSlewRate. Then, the new ClockSlewRate is computed:

$$\text{Calculations of new } ClockSlewRate \quad \text{Equation 17}$$

$$ClockSlewRate = \begin{cases} \text{if}(TrueSlewRate < ClockSlewRateLowerBoundary), \\ \quad \text{then } ClockSlewLowerBoundary \\ \text{if}(ClockSlewRateLowerBoundary < TrueSlewRate < ClockSlewRateUpperBoundary,) \\ \quad \text{then } TrueSlewRate \\ \text{if}(TrueSlewRate > ClockSlewRateUpperBoundary), \\ \quad \text{then } ClockSlewUpperBoundary \end{cases}$$

$$ClockSlewRateAdjustment \quad \text{Equation 18}$$
$$ClockSlewRateAdjustment = OldClockSlewRate - ClockSlewRate$$

Business Rules for Clock Time Adjustment

The Largest Allowable Clock Change found in Table 2 (above) identifies the budget for the amount the clock's time may be adjusted every SIOI time period. Some (or all) of this budget may be spent by slew rate corrections during the current LIOI.

ClockChangeBudget$_{TICKS}$=floor(ClockSlewRate×
LACC$_{SIOI(seconds)}$−|ClockSlewRateAdjustment|×
SIOI$_{seconds}$)             Equation 19—SIOI clock change budget Depending on the storage techniques used in the implementation of the code, it may be desirable in practice to derate this budgeted value.

The budget available for clock adjustments is computed in terms of clock ticks that may be adjusted within each SIOI. (As depicted in FIG. 7, it is expected that a routine will evaluate the clock accuracy periodically, every SIOI.)

It may be necessary to derate the values used somewhat so that round off error does not create the appearance of clock ticks in the budget where they are not available.

EXAMPLE

Figure 9:
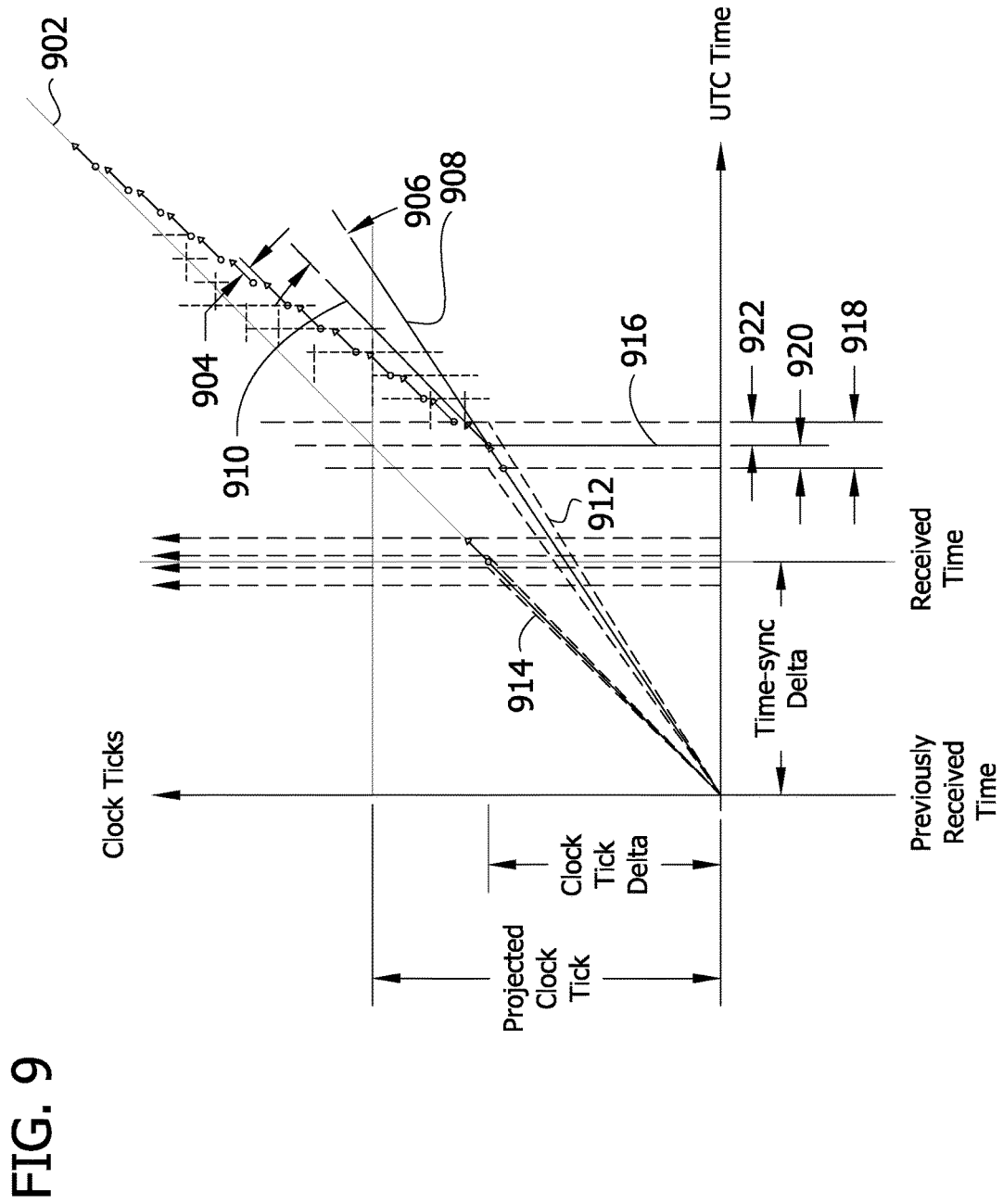
FIG. 9 is a graph illustrating correction by using minor slew rate adjustments and clock adjustments for a communication module that is time sensitive and is capable of adjusting its clock slew rate according to one embodiment.

FIG. 9 is a diagram illustrating correction by using minor slew rate adjustments and clock adjustments for a communication module that is time sensitive and is capable of adjusting its clock slew rate. In FIG. 9, line 902 is the true slew rate and interval 904 is the largest allowable clock time change (LACC). Angle 906 is the largest allowable slew rate change defined by the clock slew rate 908 and line 910, which is defined by the ClockSlewRateUpperBoundary of Equation 15. In this example, this the angle between 910 and 908 is greater than the angle between 908 and 902, the true slew rate 902. This allows for the slew rate to be corrected in a single period 922. Line 912 is the largest allowable slew rate change based on the accuracy class (AC). Line 916 is the computed time based on the clock time at the time of receipt of the time sync information. Interval 922 defines the clock update period as follows:

ClockUpdatePeriod=(LIOI*
(1−AC)).             Equation 20—clock update period

One can see in FIG. 9 that after the initial slew rate correction, subsequent corrections leave the slope of the time segment untouched, and instead increase the clock tick value (904) until the clock's tick value corresponds to the slope and position described by the true slew rate line 902.

Figure 11:
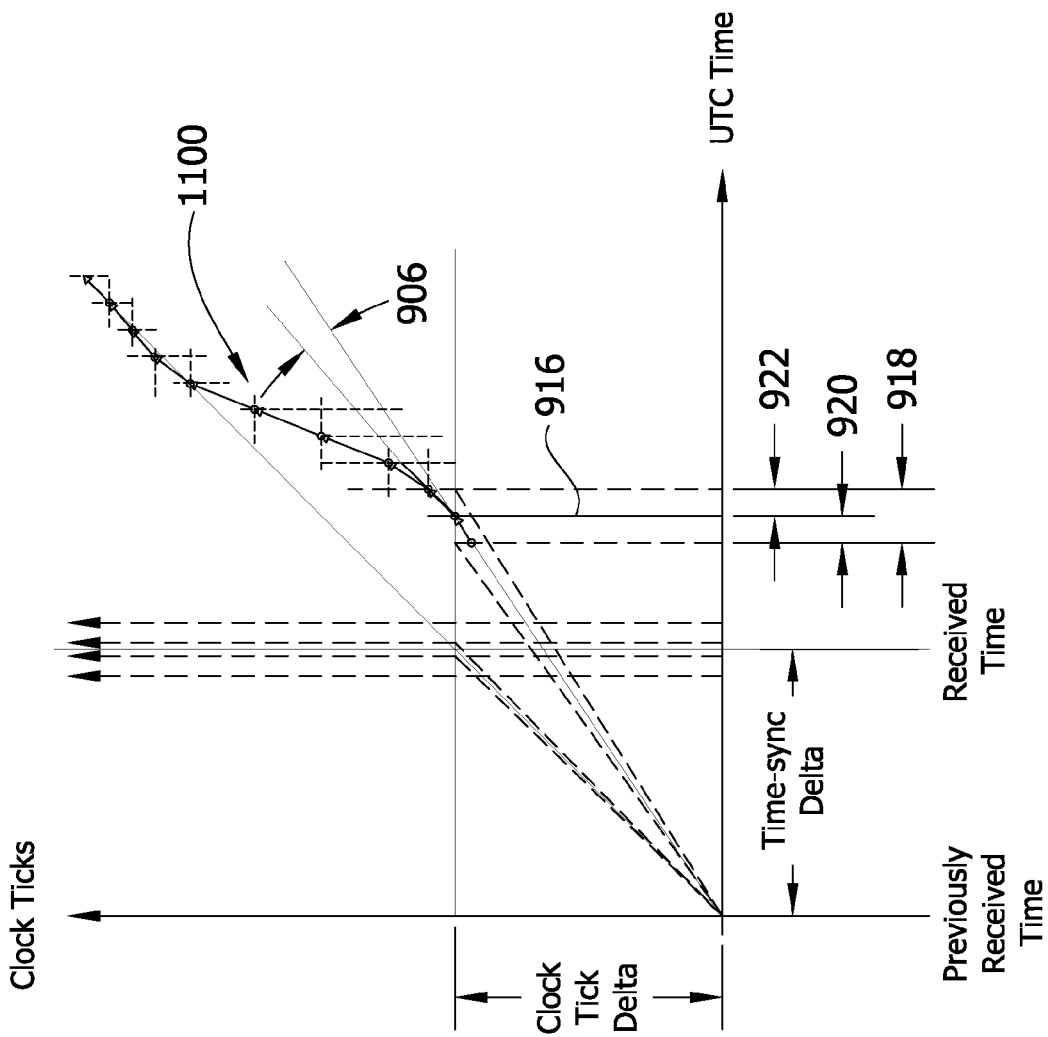
FIG. 11 is a graph according to one embodiment illustrating an underdamped response when a receiver computes an optimal path to track true time.

FIG. 10 illustrates an activity diagram according to one embodiment for incremental time adjustment wherein the clock uses a pre-computed family of slew rate curves for time adjustments. In FIG. 10, the time is computed based on the clock at 1004. At 1006, if the present time plus LIOI is ahead of the computed time by more than half of the largest allowable clock change (LACC), then the module 110 implements the next slower slew rate at 1008 and then continues its processes. At 1006, if the present time plus LIOI is not ahead of the computed time by more than half of the largest allowable clock change (LACC), then the module 110 determines at 1110 if the present time plus LIOI is behind of the computed time by more than half of the largest allowable clock change (LACC). If so, the module 110 implements the next faster slew rate at 1012 and then the module continues its processes. If not, there is no change to the slew rate and the processes continue. In one embodiment, a pre-computed family of curves exists, as shown in FIG. 11. Each curve is a slew rate which is AC/2 different than its neighbor for use at 1008 and 1012.

Equations 10 through Equation 14 describe the calculations for the TrueSlewRate.

Equation 15 describes the calculation for the ClockSlewRateUpperBoundary.

Equation 16 describes the calculations for the ClockSlewRateLowerBoundary.

Figure 12:
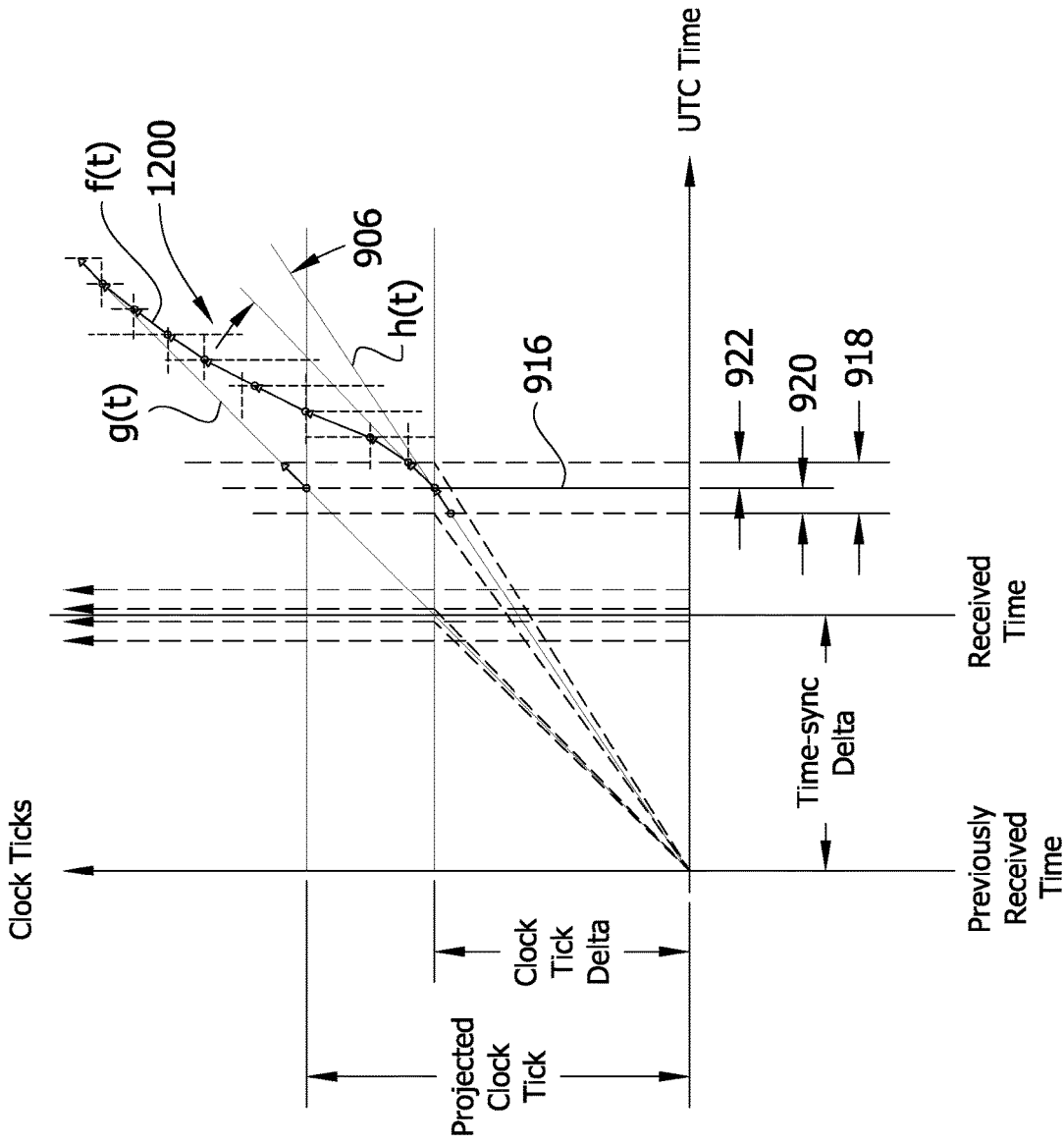
FIG. 12 is a graph according to one embodiment illustrating a critically damped response when a receiver computes an optimal path to track true time.

FIGS. 11-12 Communication Module 110 (Receiver) Performs Time-Dependant Calculations on Raw Metrology Data and Computes an Optimal Slew Rate Adjustment Path to Track True Time:

The device adjusts its slew rate in a manner to cause clock corrections without making direct adjustments to the clock time. The receiver calculates an optimal path to track true time. If the update rate to make corrections to the clock slew rate are faster than the expected changes to the clock slew rate, the tracking algorithm oscillates about the target slew rate in an under-damped fashion.

FIG. 11 is a diagram illustrating an underdamped response when a receiver computes an optimal path to track true time. In FIG. 11, interval 906 is the largest allowable slew rate change defined by Equation 15. Line 916 is the computed time based on the clock time at the time of receipt of the time sync information. Interval 918 is the slew rate adjustment period defined by (LIOI*(1−AC)). Line 1100 illustrates the undamped process when a receiver computes an optimal path to track true time, as described in FIG. 11.

In contrast, line 1200 of FIG. 12 illustrates the critically damped process when a receiver computes an optimal path to track true time. Line 1100 rises above the true-time slew line g(t), but eventually settles on the line. Such behavior is called "underdamped." In contrast, line 1200 carefully approaches the ideal line, g(t) without overshooting it. If this is done as quickly as possible, it is called a "critically damped" response. This is a preferred implementation because it corrects the error in a shorter amount of time.

Figure 13:
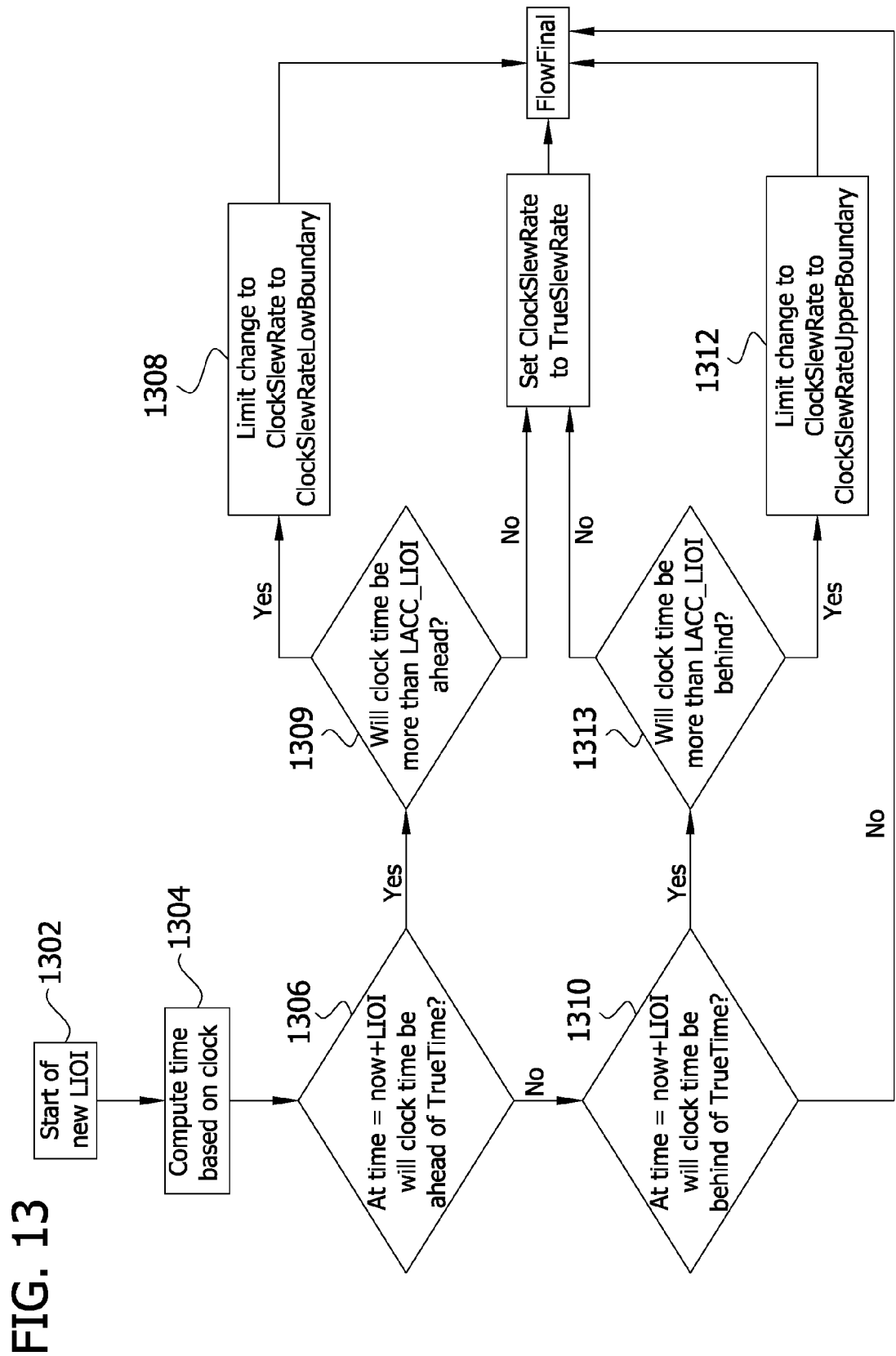
FIG. 13 is an activity diagram of processor executed instructions according to one embodiment illustrating adjusting the clock slew rate to follow the computed TrueSlewRate with constraints.

FIG. 13 is a diagram according to one embodiment illustrating adjusting the clock slew rate to follow the compute TrueSlewRate with constraints. In FIG. 13, the largest interval of interest (LIOI) boundary is crossed at 1302 and the time is computed based on the clock at 1304. At 1306, if the present time plus LIOI is ahead of the true time, then the module 110 limits the change to the clock slew rate to the low boundary at 1308 if the clock time will be more than largest allowable clock change (LACC) minus the largest interval of interest (LIOI) at 1309. At 1306, if the present time plus LIOI is not ahead of the true time, then the module 110 determines at 1310 if the present time plus LIOI is behind of the true time. If so, then the module 110 limits the change to the clock slew rate to the upper boundary at 1312 if the clock time will be less than largest allowable clock change (LACC) minus the largest interval of interest (LIOI) at 1313. If the answer to 1306 and 1308 are both NO, the processes continue. If the answer to either 1309 or 1313 is NO, then the clock slew rate can be set to the true slew rate because it fits within the rules and the processes of the module 110 continue.

We can write equations for g(t) and h(t):

h(t)=Clock$_{TICK}$×Nominal
ClockTickFrequency     Equation 21—h(t),Clock time function And h'(t)=NominalClockTickFrequency             Equation 22—h'(t)

And h''(t)=0

Similarly, g(t)=Clock$_{TICK}$×TrueSlewRate             Equation 23—g(t)

And $$g'(t) = \text{TrueSlewRate} \quad \text{Equation 24—g'(t)}$$

And $$g''(t) = 0$$

With this approach, the goal is to find the function "f(t)" which will serve as the course correction the clock must take to return the target clock time back to atomic time in the fastest possible time without violating the constraints for timekeeping accuracy.

One view would be to assume nothing about the solution to f(t) and instead define an error function as the vector difference of where the clock is compared to where it needs to be.

$$\text{ErrorFunction} = x(t) = f(t) - g(t) \quad \text{Equation 25—Error Function}$$

In one embodiment, a solution f(t) can minimize this error function. The function f(t) is subject to a number of constraints. First of all, the slew rate is not allowed to change more than the accuracy class of the metrology device:

$$f'(t) < f(t) \times \text{Accuracy Class}$$

This means that the change in the slope of the solution curve f(t) must not be more than the rate allowed by the accuracy class.

A second order differential equation is called for:

$$\frac{\partial^2 x}{\partial x^2} + 2\xi\omega_o \frac{\partial x}{\partial t} + \omega_o^2 x = 0.$$

From the discussion above, f(t) appears to resemble a damped oscillation, such that the error functions $x(t) = f(t) - g(t)$.

When this function is critically damped, $\zeta = 1$. The general solution to the critically damped function is commonly known to be:

$$x(t) = (A + Bt)e^{-\omega t}{}_o \quad \text{Equation 26—x(t)}$$

$$A = x(0) \quad \text{Equation 27—A defined}$$

$$B = \dot{x}(0) + \omega_o x(0) \quad \text{Equation 28—B defined}$$

In our application, $\omega_o$ is governed by the ability to change slew rates every Largest Interval Of Interest (LIOI).

$$\omega_0 = \frac{2\pi}{T_{LIOI}}$$

To find A, find x(0). However, $f(t_o) = h(t_o)$, so from Eqs. 25, 21 and 23:

$$x(t_o) = f(t_o) - g(t_o) = A$$

$$A = \text{ClockTime}_o - \text{TrueTime}_o \quad \text{Equation 29—"A" in terms of known values}$$

This represents the time error at the start of the error correction.

Similarly to find B we must find $\dot{x}(0)$.

$$x'(t_o) = f'(t_o) - g'(t_o)$$

But $f'(t_o) = h'(t_o)$, so from Equation and 24 Equation:

$$x'(t_o) = h'(t_o) - g'(t_o) = \text{NominalClockTickFrequency} - \text{TrueSlewRate}$$

And Equation 28, $$B = (\text{NominalClockTickFrequency} - \text{TrueSlewRate}) + \omega_o(\text{ClockTime}_o - \text{TrueTime}_o) \quad \text{Equation 30—"B" in terms of known values}$$

Then substituting Equation 26 and 23:

Optimal function for clock tick correction $\quad$ Equation 31

$$f(t) = \text{ClockTick}(t)$$
$$= (A + Bt)e_o^{-\omega t} + \text{Clock}_{TICK} \times \text{TrueSlewRate}$$

$$f(t) = \text{ClockTick}(t)$$
$$= \left( \begin{array}{c} (\text{ClockTime}_0 - \text{TrueTime}_0) + \\ \left( \begin{array}{c} (\text{NominalClockTickFrequency} - \text{TrueSlewRate}) + \\ \frac{2\pi}{T_{LIOI}}(\text{ClockTime}_0 - \text{TrueTime}_0) \end{array} \right) t \end{array} \right) e^{\frac{2\pi}{T_{LIOI}}} + \text{Clo}$$

TrueSlewRate

And taking the derivative of this equation with respect to time gives the slope:

Optimal function for clock slew rate correction $\quad$ Equation 32

$$f'(t) = \text{ClockSlewRate}(t)$$
$$= (-A\omega_0 e^{-\omega_0 t} + Be^{-\omega_0 t} - B\omega_0 t e^{-\omega_0 t}) + \text{TrueSlewRate}$$
$$= (-A\omega_0 + B(1 - \omega_0 t))e^{-\omega_0 t} + \text{TrueSlewRate}$$

$$= \left( \begin{array}{c} -(\text{ClockTime}_0 - \text{TrueTime}_0)\frac{2\pi}{T_{LIOI}} + \\ \left( \begin{array}{c} (\text{NominalClockTickFrequency} - \text{TrueSlewRate}) + \\ \frac{2\pi}{T_{LIOI}}(\text{ClockTime}_0 - \text{TrueTime}_0) \end{array} \right) \left(1 - \frac{2\pi}{L_{LIOI}}t\right) \end{array} \right) e^{\frac{-2\pi}{T_{LIOI}}t} +$$

TrueSlewRate

Bearing in mind the constraint that f(t) (i.e. Eq. 31) may only be evaluated once every SIOI, and f(t) (i.e. Eq. 32) may be adjusted only once every LIOI. Planned changes to the clock must be verified that they remain subject to Eq.19. Planned changes to the clock slew rate must be verified to be subject to Eqs. 15 and 16.

This approach offers the optimal solution, but it is comparatively computationally complex to other methods described above. Many times the function must run in devices which are computationally constrained. The good news however is that negative exponential functions are known to die out quickly. The term may be pre-computed and represented in a small lookup table. This reduces all of the math to simple adds and multiplies.

Figure 14:
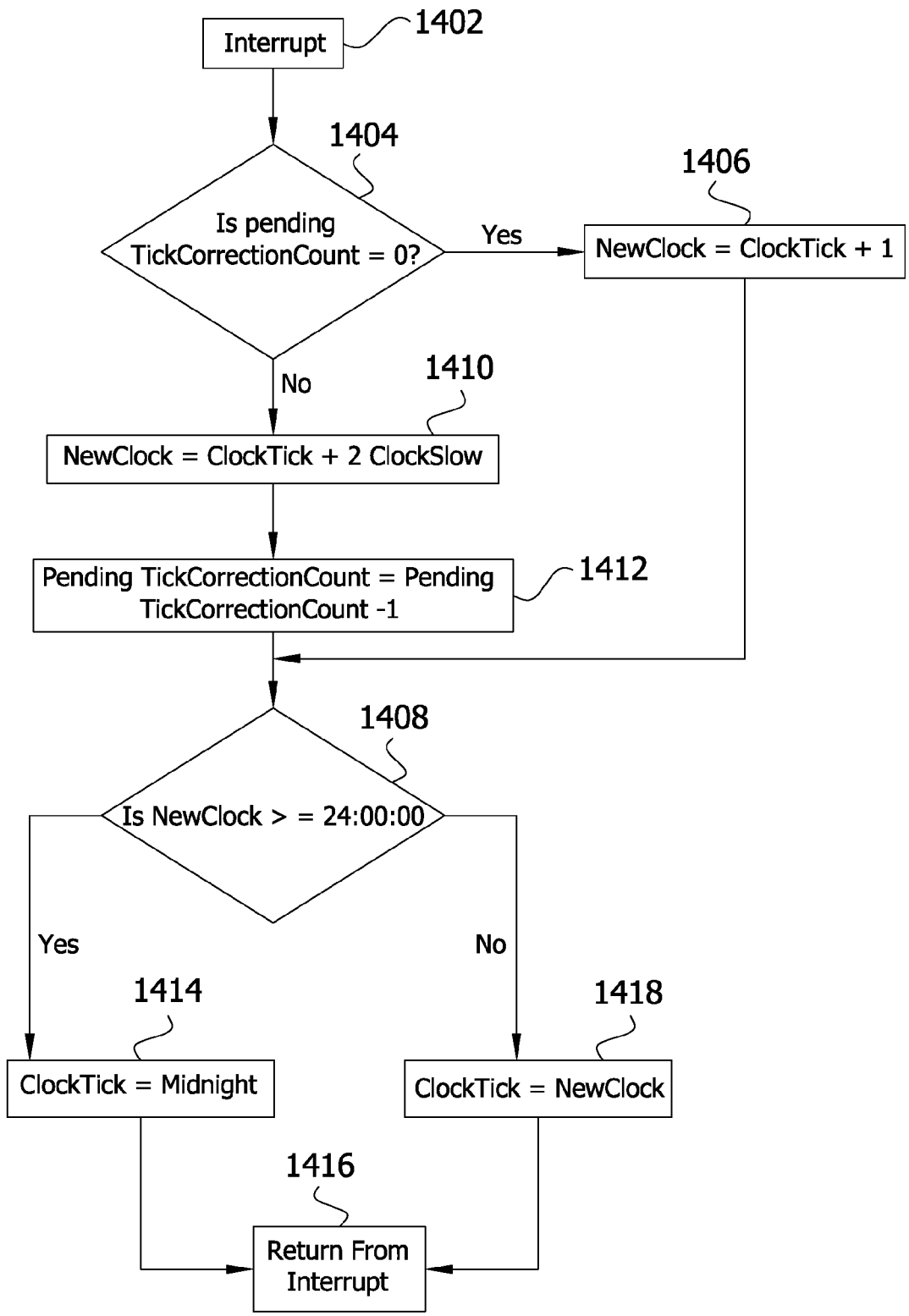
FIG. 14 illustrates an activity diagram of processor executed instructions for continuous adjustment for an interrupt driven clock according to one embodiment in which correct clock time is maintained by interdicting clock pulses.
Figure 15:
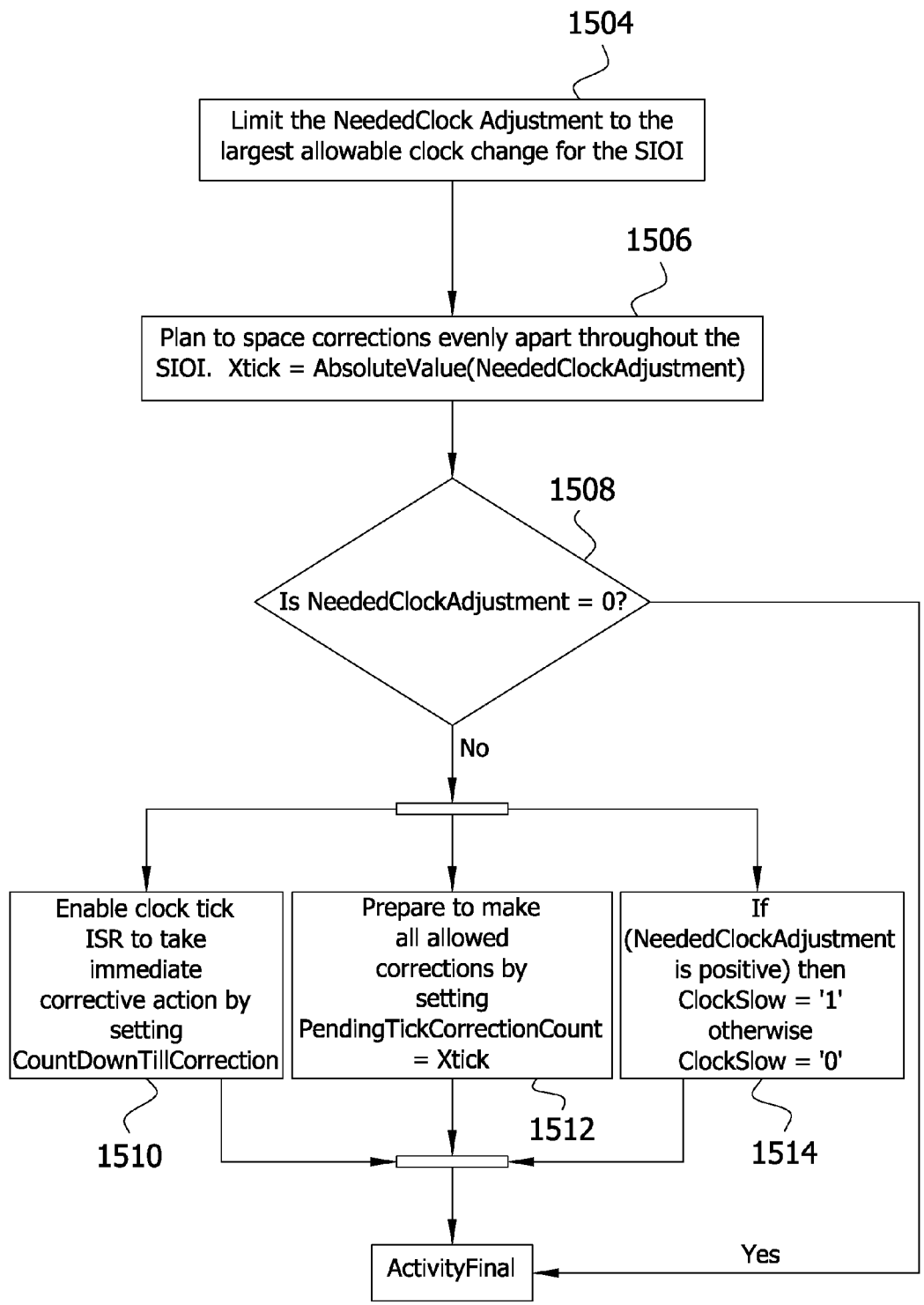
FIG. 15 illustrates an activity diagram of processor executed instructions for clock correction planning for improved interrupt service routines (ISR) for an interrupt driven clock according to one embodiment in which correct clock time is maintained by interdicting clock pulses.

FIGS. 14-15, Method to Correct Receiver Clock Time by Interdicting Clock Pulses:

It is possible to create a system that effectively modifies the clock slew rate even though the design takes pulses from a "constant frequency" source and counts them.

In one embodiment, an architecture is provided for an interrupt driven clock in which correct clock time is maintained by interdicting clock pulses. A frequency source having an output connected to an interrupt pin of a microprocessor interdicts clock pulses.

The input to the interrupt pin on the microprocessor might be a circuit that counts power line half cycles, or some other pulse source that, after frequency reduction, generates pulses at a reliable rate which is slow enough to allow the microprocessor to execute thousands of instructions between interrupts.

In one embodiment, an assumed legacy clock interrupt service routine (ISR) is provided for an interrupt driven clock in which correct clock time is maintained by interdicting clock pulses. Upon receiving an interrupt signal, one tick is added to the Clock Tick counter. If the time with the added clock tick is larger than the maximum allowed value, the Clock Tick is set to zero (midnight). Otherwise, the interrupt is completed and the processor returns to execute its normal routine.

When the clock has run ahead of true time, and needs to be throttled back, the clock tick counter needs to be reduced. This can be effectively accomplished by simply failing to count every pulse that the frequency source generates. A hardware circuit can intercept the pulse, or if it is done in software, the pulse can be thrown away.

Likewise, when the clock is running slow it is possible (in some designs) to generate an additional pulse beyond the ones that would normally occur. A hardware circuit could introduce an extra pulse, or if implemented in software, the software could bump the counter twice.

FIG. 14 illustrates an activity diagram for continuous adjustment for an interrupt driven clock in which correct clock time is maintained by interdicting clock pulses. At 1402, an interrupt begins the process and at 1404 a determination is made as to whether the clock is correct by determining whether the pending tick correction count is zero. If so, one tick is added at 1406 and the module 110 proceeds to 1408. If not, a gain or loss pulse is implemented at 1410 and the correction is determined at 1414, then proceeding to 1408. If the new clock time is greater than or equal to 24:00:00, then the clock tick is reset to midnight at 1414 and the module returns for further process operation at 1416. If the new clock time is less than 24:00:00, then the clock tick is reset to the new clock time at 1418 and the module returns for further process operation at 1416.

This formula also assumes that the algorithms do not run at the clock tick level of granularity. Some conversion is done from clock ticks to time, and clock ticks are much finer-grained resolution than the time which is observed by the application. By this, if some process is running which looks for the top of the hour, it is assumed that if the clock is incremented by two ticks instead of one, that it will not have an adverse effect on the algorithm's ability to initiate the event.

In one embodiment, a power-up initialization is provided for improved ISR for an interrupt driven clock in which correct clock time is maintained by interdicting clock pulses. At power-up, the needed clock adjustment and the tick count ($X_{tick}$) are set to zero.

FIG. 15 illustrates clock correction planning for improved ISR for an interrupt driven clock in which correct clock time is maintained by interdicting clock pulses. In this example, a smallest interval of interest (SIOI) time period rule is applied. At 1504, the needed clock adjustment is limited to the LACC for the SIOI. At 1506, the corrections are spaced evenly throughout the SIOI. If clock adjustment is needed at 1508, it is implemented by all three corrective actions 1510, 1512 and 1514. All three actions are taken in no particular order. If no adjustment is needed at 1508, or after adjustment at 1510, 1512 and 1514, the module process continues (e.g., communicating time stamped metering information) at Activity Final FIG. 16, Receiver Clock Adjustment in a Manner that Simulates Slew Rate Adjustment:

With a simple enhancement to the algorithm described in FIG. 14, it is possible to support a technique that creates a clock with an adjustable slew rate.

Rather than apply all of the corrections to the clock in quick succession, it is possible to spread out the corrections over the SIOI.

If we let:

$X_{TICK}$=The correction to apply during the SIOI (in terms of clock ticks).

$N_{TICK}$=Nominal Clock Ticks in the SIOI at the nominal source frequency.

Then, $$CounDownTillCorrection = \text{floor}\left(\frac{N_{TICK}}{X_{TICK}}\bigg|\frac{N_{TCIK}}{X_{TICK}}\bigg|\right).$$

Provides the number of clock ticks between corrections. Each correction either loses a tick that would have otherwise been gained, or gains an extra tick.

If we introduce a value "S" that is retained from one SIOI to the next as the standing slew rate correction, this can serve as a means to adjust the slew rate of the clock on an ongoing basis.

$$S = \frac{ClockSlewRate}{TrueSlewRate}$$

The formulas for the ClockSlewRate and the TrueSlewRate are found in Eqs. 8 and 10.

If an ongoing change to the clock slew rate is not needed, then S=1.

Then,

Countdown till correction    Equation 33

$$CoundownTillCorrection = \left|\frac{S \times N_{TICK}}{X_{TICK}}\right|$$

The planning for each clock correction occurs at the start of the SIOI and completes before the end of the SIOI.

Figure 16:
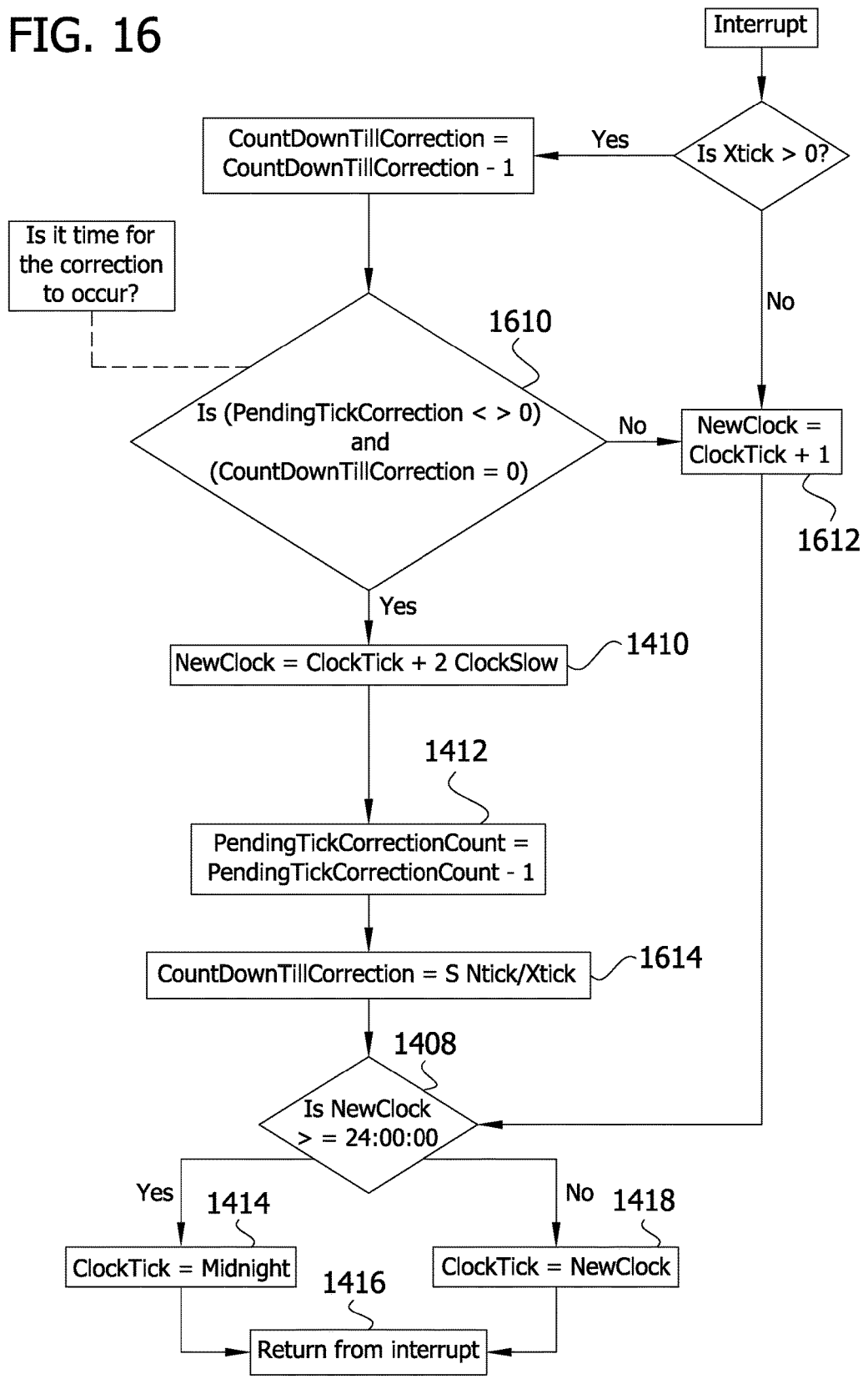
FIG. 16 illustrates an activity diagram of processor executed instructions for improved interrupt service routines (ISR) to enable gradual clock correction or sustain a continuous slew rate adjustment to the clock for an interrupt driven clock according to one embodiment in which correct clock time is maintained by interdicting clock pulses.

FIG. 16 illustrates improved interrupt service routines (ISR) to enable gradual clock correction or sustain a continuous slew rate adjustment to the clock for an interrupt driven clock according to one embodiment in which correct clock time is maintained by interdicting clock pulses. At 1610, the module 110 determines if a correction of any kind is needed. If not, the new clock time is the clock ticks plus 1 at 1612. If YES, then the process is similar to FIG. 14 with a countdown till correction (eq. 33) equal to the slew rate S multiplied by $N_{tick}/X_{tick}$ (see above) at 1614.

Although the above system, module and process have been described with time correction provided by the processor 113 of the communication module 110 to make gradual corrections to time, the scope of the invention and/or claims is not limited to such implemented in the communications module 110. It is contemplated that the corrections may be executed on some other processor or chip in the metering device A, B, ... Z, including a processor or chip in the metrology device 114.

In one embodiment, an advanced metering infrastructure (AMI) system comprises a meter data management system, an AMI network, a first network communication module 108, and a first plurality of metering devices A-Z. The AMI network connects to a reference time clock and connects to the meter data management system. The first network communication module 108 connects to the AMI network and is in communication with the reference time clock via the AMI network. Each metering device connects to the first network communication module 108 and comprises a first metrology device 114 having a first metrology clock 116 and providing metering information based on its first metrology clock 116, and a first communication module 110 having a first module clock 112 and connected between the first metrology device and first network communication module for communicating the metering information of the first metrology device 114 to the meter data management system via the first network communication module and via the AMI network.

In one embodiment, the first metrology device 114 is configured to satisfy an accuracy class (AC), the first metrology device 114 has a predefined smallest interval of interest time period (SIOI), and the first metrology clock 116 has a predefined largest allowable clock change time period (LACC) based on the accuracy class and the SIOI of the first metrology device 114.

In one embodiment, the first communication module 110 provides clock adjustments to the first metrology device 114 for the first metrology clock 116 based on the accuracy class of the first metrology device 114.

In one embodiment, at least one of the following:
the first metrology device provides clock adjustments for the first metrology clock based on an accuracy class of the first metrology device;
the first metrology device provides clock adjustments to the first communications module for the first module clock based on an accuracy class of the of first communication module;
the first communications module provides clock adjustments for the first module clock based on an accuracy class of the first communication module; and
the first communications module provides clock adjustments to the first metrology device for the first metrology clock based on an accuracy class of the first metrology device.

In one embodiment, a communications module 110 is for use in an advanced metering infrastructure (AMI) system. The AMI system includes an AMI network 102 connected to a reference time clock (e.g., atomic clock 104) and connected to a meter data management system 106. The AMI system also includes a network communication module 108 connected to the AMI network 102 and in communication with the reference time clock 104 via the AMI network 102. The AMI system also includes a plurality of metering devices A, B, ..., Z, each metering device adapted to be connected to the network communication module 108 and each metering device comprising a metrology device 114 having a metrology clock 116 and providing metering information based on its metrology clock 116. Each metrology device 114 has a predefined smallest interval of interest time period (SIOI), and each metrology clock 116 has a predefined largest allowable clock change time period (LACC) based on the accuracy class and the SIOI of its metrology device 114. The communication module 110 is adapted for use in association with one of the metrology devices 114 and comprises:
a module clock 112; and
a processor 113 configured to provide clock adjustments to its associated metrology device 114 for its associated metrology clock 116 based on the accuracy class of its associated metrology device 114, the processor 113 having ports P for connecting between the metrology device and the network communication module, the processor 113 for communicating the metering information of the metrology device 114 to the meter data management system via the network communication module 108 and via the AMI network 102.

In one embodiment, a method for use in an advanced metering infrastructure (AMI) system comprising a meter data management system; an AMI network connected to a reference time clock and connected to the meter data management system; a first network communication module 108 connected to the AMI network and in communication with the reference time clock via the AMI network; and a first plurality of metering devices A-Z. Each metering device connects to the first network communication module 108 and each metering device comprises a first metrology device 114 having a first metrology clock 116 and providing metering information based on its first metrology clock 116; and a first communication module 110 having a first module clock 112 and connected between the first metrology device and first network communication module for communicating the metering information of the first metrology device 114 to the meter data management system via the first network communication module and via the AMI network. The first metrology device 114 is configured to satisfy an accuracy class (AC), and has a predefined smallest interval of interest time period (SIOI). The first metrology clock 116 has a predefined largest allowable clock change time period (LACC) based on the accuracy class and the SIOI of the first metrology device 114. The method comprises providing clock adjustments to the first metrology device 114 for the first metrology clock 116 based on the accuracy class of the first metrology device 114.

In one embodiment, the method comprises at least one of the following:
providing by the first metrology device clock adjustments for the first metrology clock based on an accuracy class of the first metrology device;
providing the first metrology device clock adjustments to the first communications module for the first module clock based on an accuracy class of the of first communication module;
providing the first communications module clock adjustments for the first module clock based on an accuracy class of the first communication module; and
providing the first communications module clock adjustments to the first metrology device for the first metrology clock based on an accuracy class of the first metrology device.

The above summaries are provided to introduce a selection of concepts in simplified form that are further described below in the Detailed Description. The summaries are not intended to identify key features or essential features of the claimed subject matter, nor is it intended to be used as an aid in determining the scope of the claimed subject matter.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communication network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The Abstract and summary are provided to help the reader quickly ascertain the nature of the technical disclosure. They are submitted with the understanding that they will not be used to interpret or limit the scope or meaning of the claims.

What is claimed is:

1. An advanced metering infrastructure (AMI) system comprising:
 a meter data management system;
 an AMI network connected to a reference time clock and connected to the meter data management system;
 a first network communication module connected to the AMI network and in communication with the reference time clock via the AMI network; and
 a first plurality of metering devices A-Z, each metering device connected to the first network communication module and each metering device comprising:
  a first metrology device having a first metrology clock and providing metering information based on its first metrology clock, wherein the first metrology device is configured to satisfy an accuracy class (AC), wherein the first metrology device has a predefined smallest interval of interest time period (SIOI), and wherein the first metrology clock has a predefined largest allowable clock change time period (LACC) based on the accuracy class and the SIOI of the first metrology device; and a first communication module having a first module clock and connected between the first metrology device and first network communication module for communicating the metering information of the first metrology device to the meter data management system via the first network communication module and via the AMI network;

wherein the first communication module provides clock adjustments to the first metrology device for the first metrology clock based on the accuracy class of the first metrology device.

2. The system of claim 1 wherein at least one of the following:

the first communication module provides to the first metrology device clock adjustments for the first metrology clock within a predefined largest interval of interest time period (LIOI) of the first metrology device and wherein each of the provided adjustments is smaller than the LACC for the first metrology clock; and the first communication module provides to the first metrology device multiple clock adjustments for the first metrology clock within a predefined largest interval of interest time period (LIOI) of the first metrology device as a function of the SIOI of the first metrology device.

3. The system of claim 1 wherein at least one of the following:

the first communication module provides to the first metrology device multiple clock adjustments for the first metrology clock within a predefined largest interval of interest time period (LIOI) of the first metrology device and wherein the first communication module provides to the first metrology device clock adjustments for the first metrology clock in which each adjustment includes arithmetically adjusting a clock tick counter of the first metrology clock; and the first communication module provides to the first metrology device multiple clock adjustments for the first metrology clock within a predefined largest interval of interest time period (LIOI) of the first metrology device and wherein the first communication module provides to the first metrology device clock adjustments for the first metrology clock for interdicting pulses at a pulse source of the first metrology clock to increase or decrease a count of the pulse source by the first metrology clock.

4. The system of claim 1 wherein the first communication module calculates a clock adjustment for the first metrology clock, and when the calculated adjustment is greater than a preset adjustment which affects an integrity of the metering information, then the first communication module provides to the first metrology device clock adjustments for the first metrology clock within the SIOI of the first metrology device, the provided adjustments being a fraction of the calculated adjustment.

5. The system of claim 1 wherein at least one of the following:

the first communication module provides to the first metrology device clock adjustments for the first metrology clock for adjusting its slew rate to "re-baseline" the first metrology clock and wherein the slew rate adjustments are provided periodically as a function of a predefined largest interval of interest time period (LIOI) of the first metrology device; and the first communication module provides to the first metrology device clock adjustments for the first metrology clock for adjusting its slew rate until the slew rate is within a preset range and then the first communication module provides to the first metrology device clock adjustments for the first metrology clock for an amount which is less than a preset adjustment which affects the integrity of the metering information; and the first communication module provides to the first metrology device adjustments to a slew rate of the first metrology clock for causing clock corrections without making direct adjustments to the time of the first metrology clock.

6. The system of claim 1 including at least one of the following:

(a) wherein the first communication module derives time-based data from raw metrology data and requires a clock as accurate as the raw metrology data, and makes adjustments to the first metrology clock as follows:

when the first metrology clock is running faster than the time indicated by a projected "true time" from the raw metrology data, the first communications module provides to the first metrology device adjustments for the first metrology clock such that a clock tick counter of the first metrology clock is reduced by intercepting one or more of its pulses or by not counting one or more of its pulses; and when the first metrology clock is running slower than the time indicated by the projected "true time" from the raw metrology data, the first communications module provides to the first metrology device adjustments for the first metrology clock such that a clock tick counter of the first metrology device is increased by adding one or more pulses to its pulses or by applying one or more pulses to the counter; and (b) wherein the first communication module derives time-based data from raw metrology data and requires a clock as accurate as the raw metrology data, and makes adjustments to the first metrology clock as follows:

when the first metrology clock is running faster than the time indicated by a projected "true time" from the raw metrology data, the first communications module provides to the first metrology device adjustments for the first metrology clock such that a clock tick counter of the first metrology clock is reduced by intercepting one or more of its pulses or by not counting one or more of its pulses; and when the first metrology clock is running slower than the time indicated by the projected "true time" from the raw metrology data, the first communications module provides to the first metrology device adjustments for the first metrology clock such that a clock tick counter of the first metrology device is increased by adding one or more pulses to its pulses or by applying one or more pulses to the counter; and wherein the first communication module determines an adjustment for the first metrology clock and provides to the first metrology device multiple clock adjustments for the first metrology clock within a predefined largest interval of interest time period (LIOI) of the first metrology device.

7. The system of claim 1 further comprising:
a second network communication module connected to the AMI network and in communication with the reference time clock via the AMI network; and
a second plurality of metering devices A-Z, each metering device connected to the second network communication module and each metering device comprising:
a second metrology device having a second metrology clock and providing metering information based on its second metrology clock, wherein the second metrology device is configured to satisfy an accuracy class (AC), wherein the second metrology device has a predefined smallest interval of interest time period (SIOI), and wherein the second metrology clock has a predefined largest allowable clock change time period (LACC) based on the accuracy class and the SIOI of the second metrology device; and
a second communication module having a second module clock and connected between the second metrology device and second network communication module for communicating the metering information of the second metrology device to the meter data management system via the second network communication module and via the AMI network;
wherein the second communication module provides clock adjustments to the second metrology device for the second metrology clock based on the accuracy class of the second metrology device.

8. A communications module for use in an advanced metering infrastructure (AMI) system; said AMI system including an AMI network connected to a reference time clock (e.g., atomic clock) and connected to a meter data management system; said AMI system including a network communication module connected to the AMI network and in communication with the reference time clock via the AMI network; and said AMI system including a plurality of metering devices A, B, . . . , Z, each metering device adapted to be connected to the network communication module and each metering device comprising a metrology device having a metrology clock and providing metering information based on its metrology clock, wherein each metrology device has a predefined smallest interval of interest time period (SIOI), and wherein each metrology clock has a predefined largest allowable clock change time period (LACC) based on the accuracy class and the SIOI of its metrology device; said communication module adapted for use in association with one of the metrology devices, said communication module comprising:
a module clock; and
a processor configured to provide clock adjustments to its associated metrology device for its associated metrology clock based on the accuracy class of its associated metrology device;
said processor having ports P for connecting between the metrology device and the network communication module, said processor for communicating the metering information of the metrology device to the meter data management system via the network communication module and via the AMI network.

9. The communication module of claim 8 wherein at least one of the following:
the processor is configured to provide to its associated metrology device clock adjustments for its associated metrology clock within a predefined largest interval of interest time period (LIOI) of its associated metrology device and wherein each of the provided adjustments is smaller than the LACC for its associated metrology clock; and
the processor is configured to provide to its associated metrology device multiple clock adjustments for its associated metrology clock within a predefined largest interval of interest time period (LIOI) of its associated metrology device as a function of the SIOI of its associated metrology device.

10. The communication module of claim 8 wherein at least one of the following:
the processor is configured to provide to its associated metrology device multiple clock adjustments for its associated metrology clock within a predefined largest interval of interest time period (LIOI) of its associated metrology device and wherein the communication module provides to its associated metrology device clock adjustments for its associated metrology clock in which each adjustment includes arithmetically adjusting a clock tick counter of its associated metrology clock; and
the processor is configured to provide its associated metrology device multiple clock adjustments for its associated metrology clock within a predefined largest interval of interest time period (LIOI) of its associated metrology device and wherein the communication module provides to its associated metrology device clock adjustments for its associated metrology clock for interdicting pulses at a pulse source of its associated metrology clock to increase or decrease a count of the pulse source by its associated metrology clock.

11. The communication module of claim 8 wherein the processor calculates a clock adjustment for its associated metrology clock, and when the calculated adjustment is greater than a preset adjustment which affects an integrity of the metering information, then its associated the communication module provides to its associated metrology device clock adjustments for its associated metrology clock within the SIOI of its associated metrology device, the provided adjustments being a fraction of the calculated adjustment.

12. The communication module of claim 8 wherein at least one of the following:
the processor is configured to provide to its associated metrology device clock adjustments for its associated metrology clock for adjusting its slew rate to "re-baseline" its associated metrology clock and wherein the slew rate adjustments are provided periodically as a function of a predefined largest interval of interest time period (LIOI) of its associated metrology device;
the processor is configured to provide to its associated metrology device clock adjustments for its associated metrology clock for adjusting its slew rate until the slew rate is within a preset range and then its associated communication module provides to its associated metrology device clock adjustments for its associated metrology clock for an amount which is less than a preset adjustment which affects the integrity of the metering information; and
the processor provides to its associated metrology device adjustments to a slew rate of its associated metrology clock for causing clock corrections without making direct adjustments to the time of its associated metrology clock.

13. The communication module of claim 8 including at least one of the following:
(a) wherein its associated communication module derives time-based data from raw metrology data and requires a clock as accurate as the raw metrology data, and makes adjustments to its associated metrology clock as follows:
when its associated metrology clock is running faster than the time indicated by a projected "true time" from the raw metrology data, the processor is configured to provide to its associated metrology device adjustments for its associated metrology clock such that a clock tick counter of its associated metrology clock is reduced by intercepting one or more of its pulses or by not counting one or more of its pulses; and
when its associated metrology clock is running slower than the time indicated by the projected "true time" from the raw metrology data, the processor is configured to provides to its associated metrology device adjustments for its associated metrology clock such that a clock tick counter of its associated metrology device is increased by adding one or more pulses to its pulses or by applying one or more pulses to the counter; or (b) wherein its associated communication module derives time-based data from raw metrology data and requires a clock as accurate as the raw metrology data, and makes adjustments to its associated metrology clock as follows:
when its associated metrology clock is running faster than the time indicated by a projected "true time" from the raw metrology data, the processor is configured to provide to its associated metrology device adjustments for its associated metrology clock such that a clock tick counter of its associated metrology clock is reduced by intercepting one or more of its pulses or by not counting one or more of its pulses; and
when its associated metrology clock is running slower than the time indicated by the projected "true time" from the raw metrology data, the processor is configured to provide to its associated metrology device adjustments for its associated metrology clock such that a clock tick counter of its associated metrology device is increased by adding one or more pulses to its pulses or by applying one or more pulses to the counter; and
wherein the processor determines an adjustment for its associated metrology clock and the processor is configured to provide to its associated metrology device multiple clock adjustments for its associated metrology clock within a predefined largest interval of interest time period (LIOI) of its associated metrology device.

14. An advanced metering infrastructure (AMI) system comprising:
a meter data management system;
an AMI network connected to a reference time clock and connected to the meter data management system;
a first network communication module connected to the AMI network and in communication with the reference time clock via the AMI network; and
a first plurality of metering devices A-Z, each metering device connected to the first network communication module and each metering device comprising:
a first metrology device having a first metrology clock and providing metering information based on its first metrology clock; and
a first communication module having a first module clock and connected between the first metrology device and first network communication module for communicating the metering information of the first metrology device to the meter data management system via the first network communication module and via the AMI network;
wherein at least one of the following:
the first metrology device provides clock adjustments for the first metrology clock based on an accuracy class of the first metrology device;
the first metrology device provides clock adjustments to the first communications module for the first module clock based on an accuracy class of the of first communication module;
the first communications module provides clock adjustments for the first module clock based on an accuracy class of the first communication module; and
the first communications module provides clock adjustments to the first metrology device for the first metrology clock based on an accuracy class of the first metrology device;
wherein at least one of the following:
the clock adjustments include adjusting slew rate to "re-baseline" the clock and wherein the slew rate adjustments are provided periodically as a function of a predefined largest interval of interest time period (LIOI) based on the accuracy class;
the clock adjustments include adjusting slew rate until the slew rate is within a preset range and then providing clock adjustments for an amount which is less than a preset adjustment which affects the integrity of the metering information; and
the slew rate is adjusted to cause clock corrections without making direct adjustments to the time of the clock.

15. The system of claim 14 wherein at least one of the following:
the clock adjustments are within a predefined largest interval of interest time period (LIOI) based on the accuracy class and wherein each of the provided adjustments is smaller than a predefined largest allowable clock change time period (LACC) based on the accuracy class; and
the clock adjustments are within a predefined largest interval of interest time period (LIOI) as a function of a predefined smallest interval of interest time period (SIOI) based on the accuracy class.

16. The system of claim 14 wherein at least one of the following:
the clock adjustments are provided within a predefined largest interval of interest time period (LIOI) based on the accuracy class and wherein each adjustment includes arithmetically adjusting a clock tick counter; and
the clock adjustments are within a predefined largest interval of interest time period (LIOI) based on the accuracy class and wherein the clock adjustments interdict pulses at a pulse source to increase or decrease a count of the pulse source.

17. The system of claim 14 wherein when a calculated adjustment is greater than a preset adjustment which affects an integrity of the metering information, then the adjustments are within the a predefined smallest interval of interest time period (SIOI) based on the accuracy class, the provided adjustments being a fraction of the calculated adjustment.

18. The system of claim 14 wherein at least one of the following:
when the clock is running faster than the time indicated by a projected "true time" from the raw metrology data, the adjustments are such that a clock tick counter is reduced by intercepting one or more of its pulses or by not counting one or more of its pulses and when the clock is running slower than the time indicated by the projected "true time" from the raw metrology data, the adjustments are such that a clock tick counter is increased by adding one or more pulses to its pulses or by applying one or more pulses to the counter; and when the clock is running faster than the time indicated by a projected "true time" from the raw metrology data, the adjustments are such that a clock tick counter is reduced by intercepting one or more of its pulses or by not counting one or more of its pulses and when the clock is running slower than the time indicated by the projected "true time" from the raw metrology data, the adjustments are such that a clock tick counter is increased by adding one or more pulses to its pulses or by applying one or more pulses to the counter wherein the adjustment is within a predefined largest interval of interest time period (LIOI) based on the accuracy class.

19. A method for use in an advanced metering infrastructure (AMI) system comprising:
a meter data management system;
an AMI network connected to a reference time clock and connected to the meter data management system;
a first network communication module connected to the AMI network and in communication with the reference time clock via the AMI network; and
a first plurality of metering devices A-Z, each metering device connected to the first network communication module 108 and each metering device comprising:
a first metrology device having a first metrology clock and providing metering information based on its first metrology clock, wherein the first metrology device is configured to satisfy an accuracy class (AC), wherein the first metrology device has a predefined smallest interval of interest time period (SIOI), and wherein the first metrology clock has a predefined largest allowable clock change time period (LACC) based on the accuracy class and the SIOI of the first metrology device; and
a first communication module having a first module clock and connected between the first metrology device and first network communication module for communicating the metering information of the first metrology device to the meter data management system via the first network communication module and via the AMI network;
said method comprising providing clock adjustments to the first metrology device for the first metrology clock based on the accuracy class of the first metrology device.

20. A method for use in an advanced metering infrastructure (AMI) system comprising:
a meter data management system;
an AMI network connected to a reference time clock and connected to the meter data management system;
a first network communication module connected to the AMI network and in communication with the reference time clock via the AMI network; and
a first plurality of metering devices A-Z, each metering device connected to the first network communication module and each metering device comprising:
a first metrology device having a first metrology clock and providing metering information based on its first metrology clock; and
a first communication module having a first module clock and connected between the first metrology device and first network communication module for communicating the metering information of the first metrology device to the meter data management system via the first network communication module and via the AMI network;
said method comprising at least one of the following:
providing by the first metrology device clock adjustments for the first metrology clock based on an accuracy class of the first metrology device;
providing the first metrology device clock adjustments to the first communications module for the first module clock based on an accuracy class of the of first communication module;
providing the first communications module clock adjustments for the first module clock based on an accuracy class of the first communication module; and
providing the first communications module clock adjustments to the first metrology device for the first metrology clock based on an accuracy class of the first metrology device;
wherein at least one of the following:
the provided clock adjustments include adjusting slew rate to "re-baseline" the clock and wherein the slew rate adjustments are provided periodically as a function of a predefined largest interval of interest time period (LIOI) based on the accuracy class;
the provided clock adjustments include adjusting slew rate until the slew rate is within a preset range and then providing clock adjustments for an amount which is less than a preset adjustment which affects the integrity of the metering information; and
wherein the slew rate is adjusted to cause clock corrections without making direct adjustments to the time of the clock.

21. The method of claim 20 wherein at least one of the following:
the provided clock adjustments are within a predefined largest interval of interest time period (LIOI) based on the accuracy class and wherein each of the provided adjustments is smaller than a predefined largest allowable clock change time period (LACC) based on the accuracy class; and
the provided clock adjustments are within a predefined largest interval of interest time period (LIOI) as a function of a predefined smallest interval of interest time period (SIOI) based on the accuracy class.

* * * * *